(12) United States Patent
Wang et al.

(10) Patent No.: US 8,959,595 B2
(45) Date of Patent: Feb. 17, 2015

(54) METHODS AND SYSTEMS FOR PROVIDING SECURE TRANSACTIONS

(71) Applicants: Gene Shih-Ching Wang, Cupertino, CA (US); Sherman Wang, Cupertino, CA (US)

(72) Inventors: Gene Shih-Ching Wang, Cupertino, CA (US); Sherman Wang, Cupertino, CA (US)

(73) Assignee: Bullaproof, Inc., Cupertino, CA (US)

( * ) Notice: Subject to any disclaimer, the term of this patent is extended or adjusted under 35 U.S.C. 154(b) by 85 days.

(21) Appl. No.: 13/868,019

(22) Filed: Apr. 22, 2013

(65) Prior Publication Data

US 2014/0282900 A1    Sep. 18, 2014

Related U.S. Application Data

(60) Provisional application No. 61/800,776, filed on Mar. 15, 2013.

(51) Int. Cl.
*G06F 7/04* (2006.01)
*H04L 29/06* (2006.01)

(52) U.S. Cl.
CPC .................................. *H04L 63/04* (2013.01)
USPC ............................................................ 726/4

(58) Field of Classification Search
USPC .......................................................... 726/4
See application file for complete search history.

(56) References Cited

U.S. PATENT DOCUMENTS

| 5,615,268 A | 3/1997 | Bisbee et al. |
| 5,850,442 A | 12/1998 | Muftic |
| 5,910,987 A | 6/1999 | Ginter et al. |
| 6,023,509 A | 2/2000 | Herbert et al. |
| 6,119,229 A | 9/2000 | Martinez et al. |
| 6,138,119 A | 10/2000 | Hall et al. |
| 6,199,053 B1 | 3/2001 | Herbert et al. |
| 6,289,460 B1 | 9/2001 | Hajmiragha |
| 6,487,599 B1 | 11/2002 | Smith et al. |
| 6,629,150 B1 | 9/2003 | Huded |

(Continued)

FOREIGN PATENT DOCUMENTS

| EP | 1696330 | 8/2006 |
| EP | 2124164 | 11/2009 |
| WO | WO-2008/109318 | 9/2008 |

OTHER PUBLICATIONS

Notification of the Transmittal of the International Search Report and the Written Opinion of the International Searching Authority for PCT/US14/22806 mailed Sep. 10, 2014, 10 pages.

*Primary Examiner* — Teshome Hailu
(74) *Attorney, Agent, or Firm* — Blakely, Sokoloff, Taylor & Zafman LLP

(57) ABSTRACT

Methods and systems to provide secure electronic document transactions are described. In one embodiment, a processor creates a first data storage container capable of being nested as a component file of a second data storage container. In one embodiment, the first data storage container comprises: a unique first data storage container identifier; at least one unique component file identifier to identify at least one component file of the first data storage container, and the component file is an electronic document or another data storage container. In one embodiment, the first data storage container further comprises: at least one component file hash value for the at least one component file; a first attribute set; and a first data storage container hash value calculated based on features including the at least one unique component file identifier, the at least one component file hash value, and the first attribute set.

29 Claims, 15 Drawing Sheets

(56) References Cited

U.S. PATENT DOCUMENTS

| | | |
|---|---|---|
| 6,671,805 B1 | 12/2003 | Brown et al. |
| 6,802,002 B1 | 10/2004 | Corella et al. |
| 6,807,633 B1 | 10/2004 | Pavlik |
| 6,820,202 B1 | 11/2004 | Wheeler et al. |
| 6,868,406 B1 | 3/2005 | Ogg et al. |
| 6,895,507 B1 | 5/2005 | Teppler |
| 6,904,524 B1 | 6/2005 | Jaeger, Jr. et al. |
| 6,931,420 B1 | 8/2005 | Silvester et al. |
| 6,938,156 B2 | 8/2005 | Wheeler et al. |
| 6,938,157 B2 | 8/2005 | Kaplan |
| 6,944,648 B2 | 9/2005 | Cochran et al. |
| 6,944,770 B2 | 9/2005 | Henderson et al. |
| 6,948,069 B1 | 9/2005 | Teppler |
| 6,950,940 B2 | 9/2005 | Wheeler et al. |
| 6,959,382 B1 | 10/2005 | Kinnis et al. |
| 6,963,974 B1 | 11/2005 | Skinner et al. |
| 6,978,369 B2 | 12/2005 | Wheeler et al. |
| 6,990,504 B2 | 1/2006 | Powell et al. |
| 6,990,585 B2 | 1/2006 | Maruyama et al. |
| 7,010,691 B2 | 3/2006 | Wheeler et al. |
| 7,047,416 B2 | 5/2006 | Wheeler et al. |
| 7,069,443 B2 | 6/2006 | Berringer et al. |
| 7,143,284 B2 | 11/2006 | Wheeler et al. |
| 7,146,500 B2 | 12/2006 | Hawkins et al. |
| 7,162,635 B2 | 1/2007 | Bisbee et al. |
| 7,191,392 B1 | 3/2007 | Coar |
| 7,200,749 B2 | 4/2007 | Wheeler et al. |
| 7,237,114 B1 | 6/2007 | Rosenberg |
| 7,257,228 B2 | 8/2007 | Wheeler et al. |
| 7,340,608 B2 | 3/2008 | Laurie et al. |
| 7,346,551 B2 | 3/2008 | Jimenez et al. |
| 7,392,395 B2 | 6/2008 | Ginter et al. |
| 7,409,559 B2 | 8/2008 | Brischke et al. |
| 7,437,310 B1 | 10/2008 | Dutta |
| 7,484,246 B2 | 1/2009 | Matsuyama et al. |
| 7,487,535 B1 * | 2/2009 | Isaacson et al. ............ 726/4 |
| 7,549,050 B2 | 6/2009 | Wheeler et al. |
| 7,568,104 B2 | 7/2009 | Berryman et al. |
| 7,606,734 B2 | 10/2009 | Baig et al. |
| 7,644,443 B2 | 1/2010 | Matsuyama et al. |
| 7,664,703 B2 | 2/2010 | Hansen et al. |
| 7,711,142 B2 | 5/2010 | TeSelle |
| 7,752,269 B2 | 7/2010 | Chan et al. |
| 7,797,543 B1 | 9/2010 | Campbell et al. |
| 7,861,077 B1 | 12/2010 | Gallagher |
| 7,917,767 B2 | 3/2011 | Berryman et al. |
| 7,941,342 B2 | 5/2011 | Baig et al. |
| 7,984,302 B2 | 7/2011 | Fukasawa |
| 8,024,307 B2 | 9/2011 | Imai et al. |
| 8,042,146 B2 | 10/2011 | Ohara |
| 8,046,271 B2 | 10/2011 | Jimenez et al. |
| 8,051,289 B2 | 11/2011 | Johnson et al. |
| 8,095,797 B2 | 1/2012 | Campbell et al. |
| 8,132,013 B2 | 3/2012 | Meier |
| 8,151,323 B2 * | 4/2012 | Harris et al. ............ 726/4 |
| 8,176,004 B2 | 5/2012 | Malaney et al. |
| 8,204,945 B2 | 6/2012 | Milliken et al. |
| 8,219,974 B2 | 7/2012 | Schmidt |
| 8,229,906 B2 | 7/2012 | Semerdzhiev et al. |
| 8,244,767 B2 | 8/2012 | Ancin et al. |
| 2002/0053021 A1 | 5/2002 | Rice et al. |
| 2002/0091651 A1 | 7/2002 | Petrogiannis et al. |
| 2003/0014384 A1 | 1/2003 | Ewald et al. |
| 2005/0044385 A1 | 2/2005 | Holdsworth |
| 2005/0132201 A1 | 6/2005 | Pitman et al. |
| 2005/0278552 A1 | 12/2005 | Delisle et al. |
| 2006/0010501 A1 | 1/2006 | Borrowman |
| 2006/0112271 A1 | 5/2006 | Soumiya et al. |
| 2006/0291700 A1 | 12/2006 | Ogram |
| 2007/0118732 A1 | 5/2007 | Whitmore |
| 2008/0021633 A1 | 1/2008 | Naito et al. |
| 2008/0022100 A1 | 1/2008 | Ginter et al. |
| 2008/0133940 A1 | 6/2008 | Laurie et al. |
| 2008/0250239 A1 * | 10/2008 | Risan et al. ............ 713/153 |
| 2009/0006996 A1 | 1/2009 | Saha et al. |
| 2009/0089337 A1 | 4/2009 | Perlin et al. |
| 2010/0042846 A1 * | 2/2010 | Trotter et al. ............ 713/182 |
| 2010/0107101 A1 | 4/2010 | Shaw et al. |
| 2010/0161963 A1 | 6/2010 | Ginter et al. |
| 2010/0191701 A1 | 7/2010 | Beyda et al. |
| 2010/0325698 A1 | 12/2010 | Ginter et al. |
| 2011/0072272 A1 | 3/2011 | Corbin et al. |
| 2011/0247049 A1 | 10/2011 | Lee et al. |
| 2012/0198448 A1 | 8/2012 | Cervantes et al. |
| 2012/0216246 A1 | 8/2012 | Brennan et al. |
| 2012/0331108 A1 | 12/2012 | Ferdowsi et al. |

* cited by examiner

METHODS AND SYSTEMS FOR PROVIDING SECURE TRANSACTIONS

RELATED APPLICATIONS

This application claims the benefit of U.S. Provisional Application No. 61/800,776, filed on Mar. 15, 2013, the entire contents of which are hereby incorporated by reference.

FIELD

Embodiments described herein generally relate to electronic document security and transactions.

BACKGROUND

Transactions can be made possible by the presentation or exchange of intermediary transaction objects, whether they are used for the communication of intent such as a purchase order, a proof of identity such as a driver's license, a medium of exchange and store of value such as cash or concert tickets, terms of agreement such as a contract, or an affirmation of completion such as a receipt.

Existing transaction systems were designed for specific implementations of digital transactions and fail to provide a secure and versatile transaction system. Email, for example, is an insecure means for transferring documents. The ability to edit Email messages and attachments from person to person can create uncertainty of the message and attachment integrity, thus rendering Email unsuitable for document security and credible transaction purposes.

Existing database systems are employed for data or figure-based transactions, such as bank account balances and bank fund transfers. However, existing database transactions are conducted in a transient manner with intangible records of data and data modifications.

Traditional public key infrastructure (PKI) may be used for secure one-way file transfers between parties but digital signatures and corresponding files lack flexibility for multiple transaction events.

Digital content container systems are limited to granting or denying access and encrypting container content. Because the purpose of these container systems is to manage the access rights of digital content, these containers can be copied and distributed to multiple owners. In addition, these systems are unable to efficiently process transaction objects and multiple transaction events.

Certain document transaction services suffer from problems with software compatibility, upgradeability, error detection and troubleshooting, virus protection, synergy among various applications and user accounts, and management of user activity. In other document transaction systems, discrepancies or confusion among users holding multiple, distinct copies of the same transaction object may arise.

SUMMARY OF THE DESCRIPTION

Embodiments disclosed herein relate to a data processing system, method, and apparatus for secure electronic document transactions. In one embodiment, a processor coupled to a memory to store instructions creates a first data storage container capable of being nested as a component file of a second data storage container. In one embodiment, the first data storage container includes a unique first data storage container identifier, at least one unique component file identifier to identify at least one component file of the first data storage container, and the component file is an electronic document or another data storage container. In one embodiment, the first data storage container further includes at least one component file hash value for the at least one component file, a first attribute set, and a first data storage container hash value calculated based on features including at least one unique component file identifier, the at least one component file hash value, and the first attribute set.

Other features and advantages will be apparent from the accompanying drawings and from the detailed description.

BRIEF DESCRIPTION OF THE DRAWINGS

The present invention is illustrated by way of example, and not by way of limitation, in the figures of the accompanying drawings.

DETAILED DESCRIPTION

Figure 1:
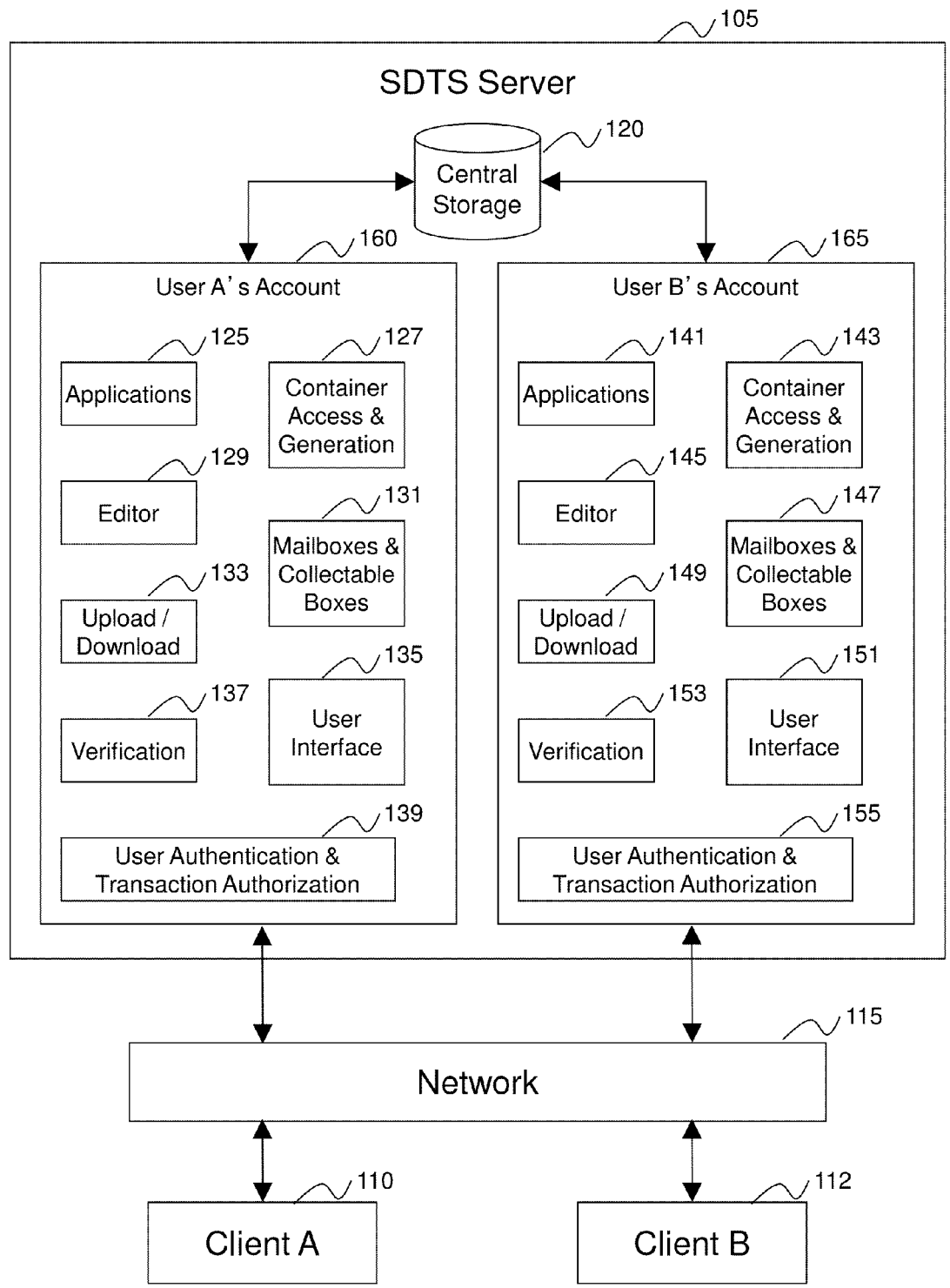
FIG. 1 illustrates a block diagram of an exemplary Secure Document Transaction System.

Various embodiments and aspects of the invention(s) will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Overview

The Secure Document Transaction System (SDTS) disclosed herein provides server-based user accounts (User Accounts), storage, electronic mail processing (SDTS Mail), and a secure virtual filing infrastructure for electronic documents (E-docs) and data storage containers (Containers).

The SDTS acts as a trusted third party between senders and recipients of E-docs and Containers, providing a server infrastructure to enable users to perform secure electronic document transactions. Through the SDTS, users are able to create, upload, view, transfer, and store E-docs and Containers at their User Accounts. A Container is an SDTS-specific file that can be transferred from a sending User Account to receiving User Account(s) to perform a transaction. Containers are sent to receiving User Account(s) through SDTS Mail within the SDTS Server. E-docs can be sent to other User Account(s) as component files of Containers.

Containers can comprise one or more component file identifiers. Component files can be E-docs, other Containers, or a combination of more than one of these. E-docs can be digital files of any human readable or machine program format, uploaded from a user client (Client) or created in the SDTS Server. Because a new Container is able to reference existing Containers as component files, multiple, chained transaction events are recorded through each new Container's expanding, nested file structure.

E-docs and Containers are assigned SDTS system-wide unique identifiers (UIDs) and stored in a central storage (Central Storage) accordingly. E-doc and Container UIDs can be used throughout the SDTS as references to their corresponding files stored in Central Storage. E-doc and Container UIDs may be used as, but are not limited to, references in SDTS Mail, references in User Accounts, or references to component files in a Container. In this manner, herein described as a virtual filing infrastructure, the SDTS is able to store single, authoritative copies of E-docs and Containers in Central Storage while transactions within the SDTS solely make reference to those files based on their UIDs.

In addition to component file identifiers, Containers can comprise hash values for each component file as well as a set of attributes (Attributes) describing underlying data or operational instructions for the Container. The SDTS Server is also able to calculate and record in the Container an encompassing hash value for the Container (Container Hash Value) that is calculated based on the Container's essential features including, but not limited to, the component file identifier(s), the component file hash value(s), and the Attributes. The Container Hash Value can be used to maintain and verify the integrity of the Container and its individual features from unintentional or malicious alterations or file corruptions.

In one embodiment, the features used to create the Container Hash Value are unalterable upon assignment of the Container UID to the Container. Thus, E-docs and Containers are permanent when assigned UIDs and stored in Central Storage such that modifications cannot be made to existing E-doc or Container files under the same UIDs. In order to transfer an existing Container in the SDTS, the SDTS Server generates a new Container with a new UID. The new Container can nest the existing Container as its component file (i.e. the SDTS Server records the existing Container's UID as a component file of the new Container) and contain Attributes describing the event details and the new Container's association with the existing Container. Likewise, for modifications to an existing E-doc, the SDTS Server generates a new E-doc with a new UID to be stored in Central Storage.

Users of the SDTS are authenticated through an SDTS User Authentication module prior to accessing their User Accounts. Upon creating and sending a new Container, a user may further provide a transaction authorization (Transaction Authorization) which combines the Container Hash Value of the said Container with identifying information of the said user. Depending on the desired or required level of security for the Container, the Transaction Authorization can be manifested as but not limited to: a stored event based on a response to an Email confirmation link or an entered password or passcode; biometric identification; salted password (Salted Password); digital signature (Digital Signature); a combination of more than one of these methods. The Transaction Authorization provides non-repudiable proof of the authorizing user's identity as well as verifiable proof of integrity for the corresponding Container.

At their respective User Accounts, SDTS users can retrieve Containers and E-docs for download, viewing, or further transaction processing. An SDTS Editor at a User Account can be used to create and view E-docs. A Files Overlap Display Attribute for a Container can specify that certain of the Container's underlying E-docs should be displayed as overlapping graphical layers on a canvas in a specified display order when viewed in the SDTS Editor. The Files Overlap Display Attribute allows users to view multiple underlying files of a Container as one transaction object while still maintaining each underlying file to be independently verifiable for its own integrity and non-repudiation.

The SDTS infrastructure allows various SDTS Applications to interface with Containers as well as provide and manage Application-specific transaction services for SDTS users within the SDTS. With the customization of Application policies, Container Attributes and Container Notes, an SDTS Application can also generate Application-specific Containers. The variety of SDTS Applications and Application-specific Containers can be broadly categorized to include, but are not limited to, electronic versions of the following types of transaction objects: contracts, wills, sales quotes, purchase requisitions, purchase orders, invoices, receipts, official forms and letters, messages, property ownership certificates, gift certificates, gift cards, IOUs, tickets, discount coupons, prepaid cards, point cards, money, scrip, prescriptions, business cards, student IDs, driver's licenses, passports, membership cards, certificates (of completion, of achievement, etc.), diplomas, transcripts, voting ballots, test forms, ACH transfer authorizations, checks and money orders.

In some embodiments, the SDTS Server can provide Single Ownership Control for certain Containers. The SDTS Server centrally records and manages a log of Container UIDs under Single Ownership Control and the User Account UIDs for the corresponding owners. Users can transfer their ownership of a Container under Single Ownership Control to other User Accounts. When transferring ownership of an existing Container, the SDTS Server generates a new Container to nest the existing Container. The new Container can contain Attributes describing the ownership transfer event to the new owner. The new owner is recorded in the ownership log (Single Ownership Control Log) for the new Container, and the prior entry for the existing Container is invalidated.

For certain Containers that carry commercial transaction value, the SDTS Server can also provide a Value Change means. The SDTS Server is capable of receiving an existing Container of a given value and breaking the value into two new Containers: one Container with a specified value as payment to the payee and one Container with the remaining value as change given back the payer, both of which nest the existing Container as a component file.

Advantages

In the embodiments described herein, the SDTS can serve as a third-party document transaction system providing users with a secure environment to transact Containers and E-docs with other users. Because a Container within the SDTS is a single, authoritative copy that can have distinct ownership qualities, verifiable proof of integrity, and non-repudiable proof the originator's identity, Containers in the SDTS can emulate the qualities of tangible transaction objects while also benefitting from the advantages of being transferred and maintained in an electronic, server-based transaction system. Accordingly one or more embodiments of the present invention can have one or more of the following advantages:

Transaction Security

Through the use of hash values and Transaction Authorizations, the system allows all parties of a transaction to independently verify the integrity of a Container and the identity of the user who authorized the Container transaction. Because the SDTS Server displays transaction details (e.g. special conditions such as transaction warranties or terms; transaction date and time; Transaction Authorization reasons; Transaction Authorization type; Container sender and recipients) prior to a user providing his/her Transaction Authorization, the user has clear responsibility and knowledge of the transaction details for the corresponding Container. Over the course of multiple transaction events a Container and its hash value may be continuously nested into another new Container upon each transaction event. The SDTS can keep underlying files and Attributes of all Containers secure and with verifiable integrity and Transaction Authorization event details. This allows Containers within the SDTS to be less vulnerable to file corruption, unintentional or malicious alterations, counterfeiting and fraud from outside sources. Additionally, this enables a more trustworthy and versatile transaction system in which all related parties to a transaction can independently validate Container integrity without needing to place their trust in a single authority.

Through the use of User Authentication, the SDTS can securely authenticate users accessing their SDTS User Accounts.

Through the use of electronic identification Containers, the SDTS allows users to attest to the identity of other User Accounts (e.g. an HR administrator issues an electronic proof of employment Container for an employee). This allows users within the SDTS to verify and further trust the identities of their transaction counterparties.

The SDTS Server can also maintain a secure transaction environment through frequent storage backups, file integrity checks and virus scanning. As files are transmitted between the SDTS Server and user Clients, the Server and Clients can perform encryption and decryption services to prevent unauthorized access and tampering with the system's files.

Multiple, Nested Transaction Events

Through the use of Containers and the ability to nest multiple Containers and/or E-docs as component files of a new Container, the SDTS allows users to flexibly add files in an ongoing, expanding nest of transaction events. The nesting of previous Containers and/or E-docs as component files of Containers allows for multiple, secure transactions to occur. Furthermore, the record of underlying files nested in a Container is a verifiable history of all preceding transaction events.

Through the use of a virtual filing infrastructure UIDs may be used throughout the SDTS as references. The SDTS can store single, authoritative, and permanent copies of Containers in Central Storage for all transaction parties without the confusion of multiple duplications of the same file in the system. In addition, the SDTS can perform efficient file management with fewer duplicate files being stored in Central Storage.

Attributes

Through Container Attributes, SDTS users, the SDTS Server, and SDTS Applications can specify a multitude of unique metadata, transfer event details, and commands for how the users, SDTS Server, or SDTS Applications can transfer and operate those Containers. Attributes of a Container are securely protected by the Container Hash Value, which can provide verifiable proof of the Attributes' integrity.

User Account and Internal Mail

Through the use of User Accounts and SDTS Mail, the SDTS allows users to communicate with other users as well as maintain their sent and received Containers at their User Accounts for future access and processing.

Single Ownership Control

Through Single Ownership Control, the SDTS enables distinct and transferrable ownership qualities for Containers.

Value Change

Containers may inherently store value through the use of its Attributes, and with the use of SDTS Value Change means, the SDTS enables redemption and change back upon use of the Container in a transaction. With SDTS Value Change means, the SDTS can offer a wide variety of Containers to fit various types of commercial transactions for SDTS users.

Platform for Applications

With a variety of accessible SDTS Applications at their User Accounts, SDTS users can purchase, transfer, transact, and redeem a variety of Containers. As a platform, the SDTS enables third-party service providers to create SDTS Applications to take advantage of the SDTS infrastructure and to interface with Containers or deploy unique, Application-specific Containers for SDTS users to use.

Bundled Documents

With the Container structure, the SDTS allows users to bundle multiple, related E-docs and Containers together as component files for logical documentation for mailing (e.g. an electronic invoice Container as remittance information bundled alongside an electronic check payment Container).

Cloud-Based Services and Storage

Through a server-based infrastructure, the SDTS allows users to access Containers and E-docs and conduct transactions from anywhere and anytime the SDTS server is accessible.

SDTS Server

The SDTS Server enables users to perform secure E-doc and Container transactions.

The SDTS Server can be composed of a plurality of servers arranged in a distributed manner to distribute load. Although the examples herein may refer to a single SDTS Server, features of the SDTS Server can be partitioned into separate parts that interact as a distributed set of SDTS Servers working together to provide the functionality of the SDTS Server described.

In the case of an SDTS Server crash, one or more redundant SDTS Servers can seamlessly replace any point of failure to provide uninterrupted data access to the SDTS Central Storage and SDTS Servers.

SDTS Client

In one embodiment, the SDTS Server communicates with SDTS Clients over a network. FIG. 1 illustrates the relationship between SDTS Clients and the SDTS Server, in one embodiment. In FIG. 1, Client A 110 and Client B 112 can communicate with the SDTS Server 105 individually through the network 115 (e.g. Internet, Intranet, LAN, wireless protocol or other). While only two Clients and corresponding User Accounts are shown in FIG. 1, more Clients and corresponding User Accounts can be applied to the SDTS Server in other embodiments.

SDTS users can interact with or access the SDTS Server 105 through the SDTS Clients 110 and 112. For example, the SDTS Client can be a dedicated terminal, mobile phone application, desktop computer, mobile computer, or other implementation. The SDTS Client has a lightweight communication GUI program (e.g., an Internet browser) to communicate with the SDTS Server over the network. The SDTS Server sends User Interface 135 and 151 and result data to the SDTS Client for display and for receiving the user's input. The SDTS Client is capable of receiving user input (e.g., through a keyboard, touch screen, mouse, microphone, or other input device) and transmitting a representation of the user input to the SDTS Server.

In one embodiment, an SDTS Client can have installed application software for the generation of Digital Signatures or Salted Passwords. For Digital Signature generation, the SDTS Client requires a private key, kept within the Client terminal or a private key device which can be flexibly connected and disconnected to the Client terminal.

In one embodiment, the SDTS Client can have installed encryption and decryption software and an encryption and decryption key pair for users to encrypt E-docs prior to uploading them SDTS Server and to decrypt encrypted E-docs after downloading them to the SDTS Client.

Central Storage

In FIG. 1, the SDTS Server can store, in Central Storage 120, an authoritative copy of a Container or an authoritative copy for each of its newly created or uploaded component files. Single, authoritative copies of E-doc and Container files are permanently stored in SDTS Central Storage.

SDTS Central Storage can be implemented as a single storage server or a number of distributed storage servers. In order to simplify discussion, the SDTS Central Storage is considered a component of the SDTS Server.

In one embodiment, the SDTS Server consistently backs up the SDTS Central Storage and conducts integrity checks and virus checks on the stored E-docs and Container files.

In one embodiment, the SDTS Server can provide encryption capabilities for E-docs or Containers prior to being stored in Central Storage and decryption capabilities after being retrieved from Central Storage.

In one embodiment, the SDTS Server can maintain and backup User Authentication Logs, SDTS Transaction Authorizations Logs, and Single Ownership Control Logs in Central Storage. The permanence of records in the SDTS Server prevents users from denying involvement in a transaction that occurred within the SDTS and promotes a trustworthy and secure environment for E-doc and Container transactions.

In FIG. 1, the SDTS Server's Access Unit 127 or 143 can access E-docs and Containers from SDTS Central Storage using E-doc UID and Container UID references. Accessed E-docs, Containers, and Container Attributes can also be downloaded to the SDTS Clients through the Upload/Download module 133 or 149. The Access Unit 127 or 143 may also access E-docs and Containers for the purposes of integrity verification to be done by the Verification Module 137 or 153 or for searching or filtering Container Attributes, Container Notes or UIDs.

SDTS User Accounts

In FIG. 1, the SDTS Server provides users with User Accounts 160 and 165. The SDTS Server provides SDTS Mail for transferring Container UIDs between Mailboxes 131 and 147 of User Accounts. The SDTS Server can assign a unique User Account identifier (User Account UID) for each User Account. The unique User Account UID can be used to represent the SDTS user who owns the User Account.

In one embodiment, a new user can specify the following identifying information in order to register for a User Account at the SDTS: a valid e-mail address, a full name, and authentication details (e.g. password; public key for Digital Signature purposes). When successfully registered, each User Account (e.g., User Account 160 and User Account 165) is assigned a globally unique User Account UID.

After having registered for a User Account, a user can be authenticated through the User Authentication module 139 and 155 in order to log onto their User Account. Upon logging onto a User Account, users can upload or create E-docs and generate Containers at their User Accounts. In addition, a user is permitted to perform various actions with the Containers and underlying files stored in their Mailboxes and Collectable boxes 131 and 147, including but not limited to searching, viewing, verifying, downloading and printing. If an Application-specific Container type requires a user's Transaction Authorization or if a user desires to proactively provide a Transaction Authorization for a Container transfer, the user can provide a Transaction Authorization for a Container through the Transaction Authorization module 139 and 155. Otherwise, a Container transfer can occur without a Transaction Authorization.

In one embodiment, the SDTS can allow or contains means for allowing a User Account to initiate the storing of a Container UID or its at least one component file UID.

In one embodiment, the SDTS can allow or contains means for allowing a User Account to initiate the accessing of a Container using the Container UID.

In one embodiment, the SDTS can allow or contains means for allowing a User Account to initiate the accessing of a Container's at least one component file, using the at least one unique component file UID.

In one embodiment, the SDTS is a platform for a variety of SDTS Applications that can interface with Containers or create, operate, store, manage, and transfer Application-specific E-docs and Containers for users. SDTS Applications can customize Containers to contain Application-specific Attributes and provide Application-specific user interfaces at SDTS User Accounts to receive input and display information to users. In FIG. 1, SDTS Applications 125 and 141 can be accessed by users at their User Accounts.

User Authentication

In FIG. 1, the SDTS User Authentication module 139 and 155 can authenticate users upon logging onto their SDTS User Accounts.

In one embodiment, a User Authentication Log in the User Authentication Module 139 and 155 can record information regarding activity from any User Account, including but not limited to user logon and logoff activity, logon and logoff timestamps (e.g., time and date), any failed logon attempts, accessed Containers and E-docs, and various actions (e.g. print, view, download) pertaining to accessed Containers and E-docs.

In certain embodiments, the method of User Authentication can be a password. When registering for a User Account, a user can create and input a password at the Client. The Client can encrypt the user password and send the encrypted password over the network to the SDTS Server. After the SDTS Server has associated a password to a User Account, the password is stored in the SDTS Server User Authentication Database. When a user attempts to log on to his/her User Account, the user enters a password and User Account UID at his/her Client. The user log on attempt with the User Account UID and password combination is transmitted (e.g. SSL encryption) to the SDTS Server for authentication and approval. The User Authentication Module 139 and 155 can check that the received User Account UID and password combination match the expected combination stored on the SDTS User Authentication Database. If the comparison matches, the user is authenticated and is able to log on to his User Account. In certain embodiments, a hash of the password is stored at the User Authentication Database such that a user's password entry upon a log on attempt is hashed and compared to the stored hash at the User Authentication Database. If the comparison matches, the user is authenticated and is able to log on to his User Account.

SDTS Mail

In one embodiment, the SDTS Server maintains an internal, User Account to User Account mail system means (SDTS Mail) for transferring Container UIDs from one sender to one or more recipients' User Account mailboxes. SDTS Mail is able to execute transfer instructions in the Attributes of a Container by storing Container's UID at each of the Container's one or more receiving user accounts.

After a Container is transferred, the Container UID is recorded in the "IN" Mailbox of each recipient's User Account and the "SENT" Mailbox of the sender's User Account.

Copies of certain Container UIDs can be further stored and organized accordingly in Collectable Boxes 131 and 147 at each user's User Account. Collectable Boxes allow users to quickly access and differentiate various types of Containers from other Containers. Collectable Boxes can further include "Valid" Boxes to keep Containers that are valid for transfer as well as "Invalid" Boxes to separate out Containers that are no longer usable, a mechanism which can help manage the single ownership control of Containers.

Electronic Documents

E-docs can be digital files in any human readable or machine program format created within the SDTS Server or uploaded by users to the SDTS Server. In order to be sent to other designated users in the SDTS, E-docs can be referenced in a Container as a component file. When a newly created or uploaded E-doc is referenced by a Container as a component file, the SDTS Server assigns a UID and calculates a hash value for the E-doc.

Upon being sent to designated recipients, newly uploaded or created E-docs are permanently stored in a Central Storage 120. Existing E-docs cannot be edited or replaced within a Container. If any edit is made to an existing E-doc, the SDTS Server generates a new E-doc and assigns it a new UID.

In one embodiment, users can create E-docs using SDTS Editor 129 and 145 at their User Accounts.

In one embodiment, a user can upload a file from the Client to the SDTS Server through the Upload/Download module 133 or 149. If the user uploads the same file again from the Client to the SDTS Server, the newly uploaded file is treated as a new E-doc by the SDTS Server, stored in Central Storage and assigned a new UID accordingly.

In one embodiment, a user can reference an existing E-doc UID from an existing Container to be added to a new Container. The new Container lists the referenced E-doc UID as a component file and generates an Attribute specifying the UID of the existing Container from where the E-doc was referenced.

In one embodiment, a user can verify the original integrity of an existing E-doc. The SDTS Server can recalculate the E-doc hash value and compare it to the recorded hash value in the Container that nests the E-doc as a component file.

Container Structure

In one embodiment, the SDTS includes means for creating a first Container capable of being nested as a component file of a second Container. In one embodiment, the first Container includes: a unique first Container UID and at least one unique component file UID to identify at least one component file of the first Container. A component file can be an E-doc or another Container. In one embodiment, the first Container can also include at least one component file hash value for the at least one component file, a set of Attributes, and a Container Hash Value calculated based on: the at least one unique component file identifier, the at least one component file hash value, and the set of Attributes.

Figure 2:
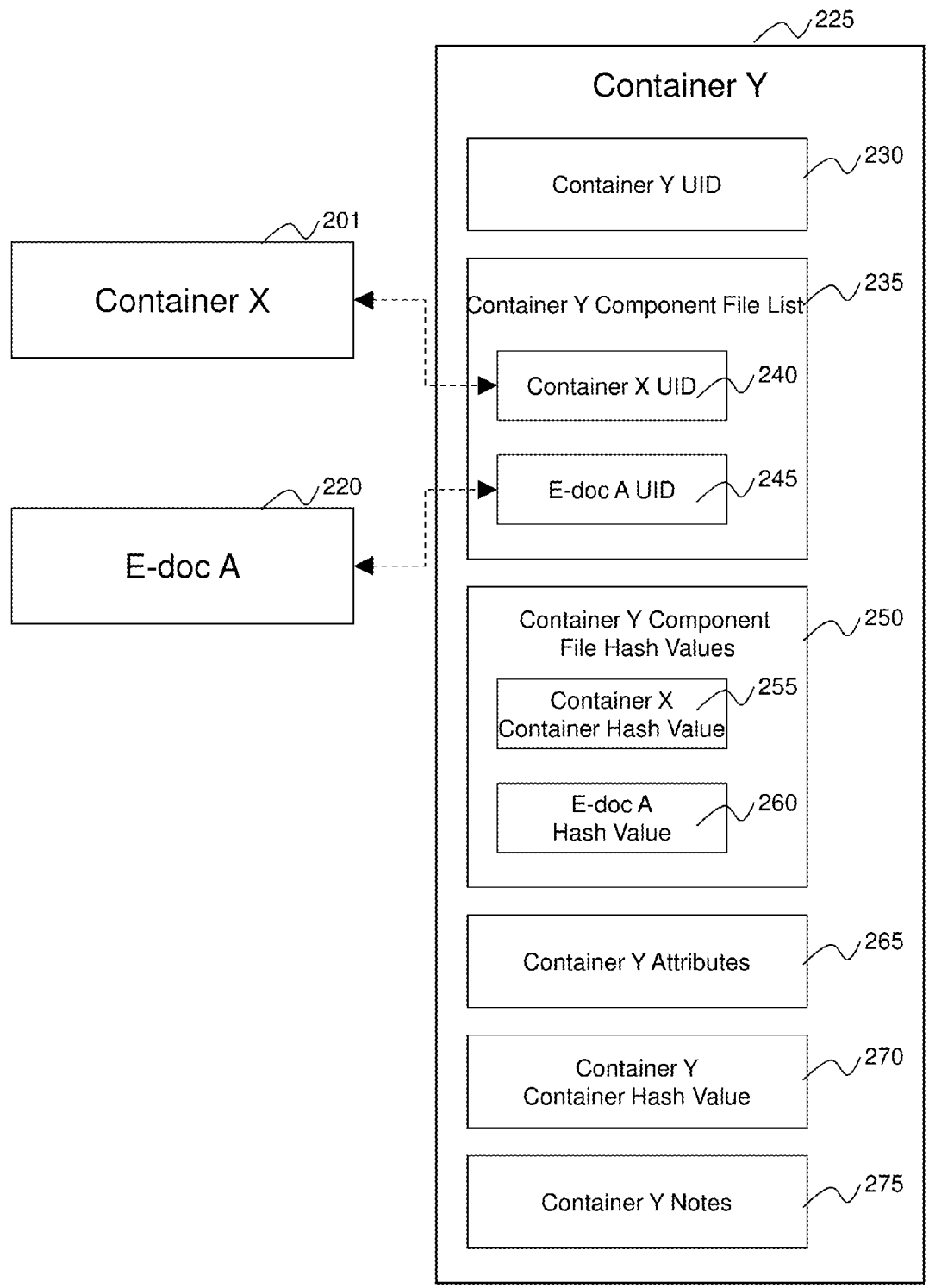
FIG. 2 illustrates a block diagram of a Container structure, in one embodiment.

FIG. 2 illustrates an example embodiment of a Container structure. Specifically, FIG. 2 illustrates Container X 201 and E-doc A 220 nested into Container Y 225. Container Y 225 contains Container Y UID 230, Container Y component file list 235, Container Y component file hash values 250, Container Y Attributes 265, Container Y Container Hash Value 270, and Container Y Notes 275 as described in further detail below. The Container Y component file list 235 contains the UIDs of its component files, which include Container X UID 240 and E-doc A UID 245. The Container Y component file hash values 250 contain Container X Container Hash Value 255 and E-doc A hash value 260.

The present invention defines "underlying" files of a Container to be any E-docs or other Containers nested one or more levels down within the present Container. That is, the underlying files can refer to the component files of the present Container, or they may refer to files nested within another Container which is nested in the present Container. For example, in FIG. 2, Container X and E-doc A are underlying files of Container Y. Likewise, if Container X contained additional component files not shown in the figure, those component files would also be underlying files of Container Y.

Container UID

The SDTS Server assigns a UID for each new Container when generated and transferred to recipient User Account(s). A Container is permanent when assigned a UID and cannot be modified or replaced with exception of the Container Notes. Any Container generated by a user or SDTS Application is treated as a new Container and provided with a new UID.

Component File List and Component Files

A component file list can include UIDs for one or more component files of a Container. The component files can be E-docs, other Containers, or a combination of more than one of these. The component file UIDs may be nested together as related transaction documents in a Container. In one embodiment, the SDTS contains means for nesting the first Container as a component file of the second Container. Because a new Container is able to nest existing Containers as component files, multiple, chained transaction events are recorded through each new Container's expanding, nested file structure.

Component File Hash Values

A Container comprises a list of hash values for each component file of the Container. If the component file is an E-doc, the component file hash value is a hash value of the E-doc. If the component file is a Container, the component file hash value is a Container Hash Value of said Container.

Upon adding a new component E-doc or Container to a Container, the SDTS assigns a UID and generates a hash value for the E-doc or Container. Upon adding an existing E-doc or Container as component files to a new Container, the SDTS Server copies over the hash value and UID for said existing E-doc or Container.

In one embodiment, the SDTS can verify or contains means for verifying integrity of a component file of a Container by recalculating the component file's hash value and comparing the result to a predetermined component file hash value stored in the Container. A hash value match can constitute verification of the integrity of the component file.

In various embodiments, the component file hash value may be produced by a hash generating program, engine or algorithm such as industry standard MD5, MD6, SHA-2, SHA-3 algorithms or other means that produces an effectively unique hash value.

Attributes

Each Container contains a set of Attributes. Attributes can be various command, data, or transfer event details related to the Container or its underlying files. Attributes of a Container can be set by the SDTS Server, users, or SDTS Applications to provide data for or guide the operations on the Container.

In one embodiment, a user can set an Attribute that places limitations on the Container's operations, such as an Attribute that limits a recipient user from transferring the Container.

In one embodiment, a user can set an Attribute that requests the SDTS to track and report activity associated with the Container, such as a request to be notified when a recipient has accessed the Container or a particular component file of the Container.

In one embodiment, a user can set an Attribute that contains identifying information for a new owner of the Container.

In one embodiment, an SDTS Application can set Attributes that contain data embedded in or related to a component file. For example, an electronic invoice Container may contain Attributes detailing the total payment amount due and due date of the invoice.

In one embodiment, an Attribute for Files Overlap Display contains instructions for the SDTS Editor to display a plurality of electronic documents as overlapping graphical layers on a canvas in a specified display order.

In one embodiment, Containers that are transferred to another user contain Attributes that specify details of the transfer including, but not limited to, the sending User Account UID, the one or more recipient User Account UIDs, Transaction Authorization event details, if any, and the date and time of the Container transfer.

In one embodiment, the time stamp details for a date and time Attribute are provided by the SDTS Server. Time stamp details may include information on the year, month, date, hour, minute, second, and/or time zone. In one embodiment, the SDTS Server provides a running clock in the user interface. Time stamp details can be captured and recorded in the Container's Attributes upon acknowledgment by the Container originator. Acknowledgment may include notification of intent of the Container originator to send the Container.

In one embodiment, the SDTS can allow or contains means for allowing a User Account to initiate the creating of a Container, where the Attributes include a set of transfer instructions for the Container identifying said User Account as the sender and a group of one or more User Accounts as recipients.

In one embodiment, Attributes of one Container can be downloaded to a Client or flexibly copied over to another Container.

Container Hash Value

The Container Hash Value is calculated based on features including the Container's at least one component file, at least one component file hash value for the at least one component file, and set of Attributes. In one embodiment, the Container's UID is an additional input for the calculation of the Container Hash Value.

A Container Hash Value can be recalculated and compared to the recorded Container Hash Value. If the values match, it verifies the Container's integrity and that the Container has not been unintentionally or maliciously altered or corrupted.

In various embodiments, the Container Hash Value may be produced by a hash generating program, engine or algorithm such as industry standard MD5, MD6, SHA-2, SHA-3 algorithms or other means that produces an effectively unique hash value.

Container Notes

In one embodiment, a Container further comprises an editable notes section (Container Notes). Container Notes are optional fields in a Container. Users, the SDTS Server, or SDTS Applications may edit or update the Container Notes without affecting the Container's Container Hash Value. In one embodiment, the Container Notes are Server Notes that can only be updated or edited by the SDTS Server. For example, a Digital Signature value from a Transaction Authorization may be recorded in the Server Notes. In another example, Server Notes may be status updates of the Container notifying transacting users which component files have been accessed.

In one embodiment, the Container Notes are Application Notes that can only be updated or edited by specific SDTS Applications. For example, an SDTS Application for issuing library cards may record the date and time information in the Application Notes each time the library card is used.

In one embodiment, the Container Notes are sharable User Notes that can be updated by users who have access to the Container. The User Notes are shared and viewable by all parties who have access to the Container. For example, a user records a public description or keywords of the Container to which all transacting parties can refer.

In one embodiment, the User Notes are private and viewable only by the user who set the Container Notes. For example, a user may record private descriptions or keywords for the Container that allow for keyword searching and filtering.

New Containers

Figure 4A:
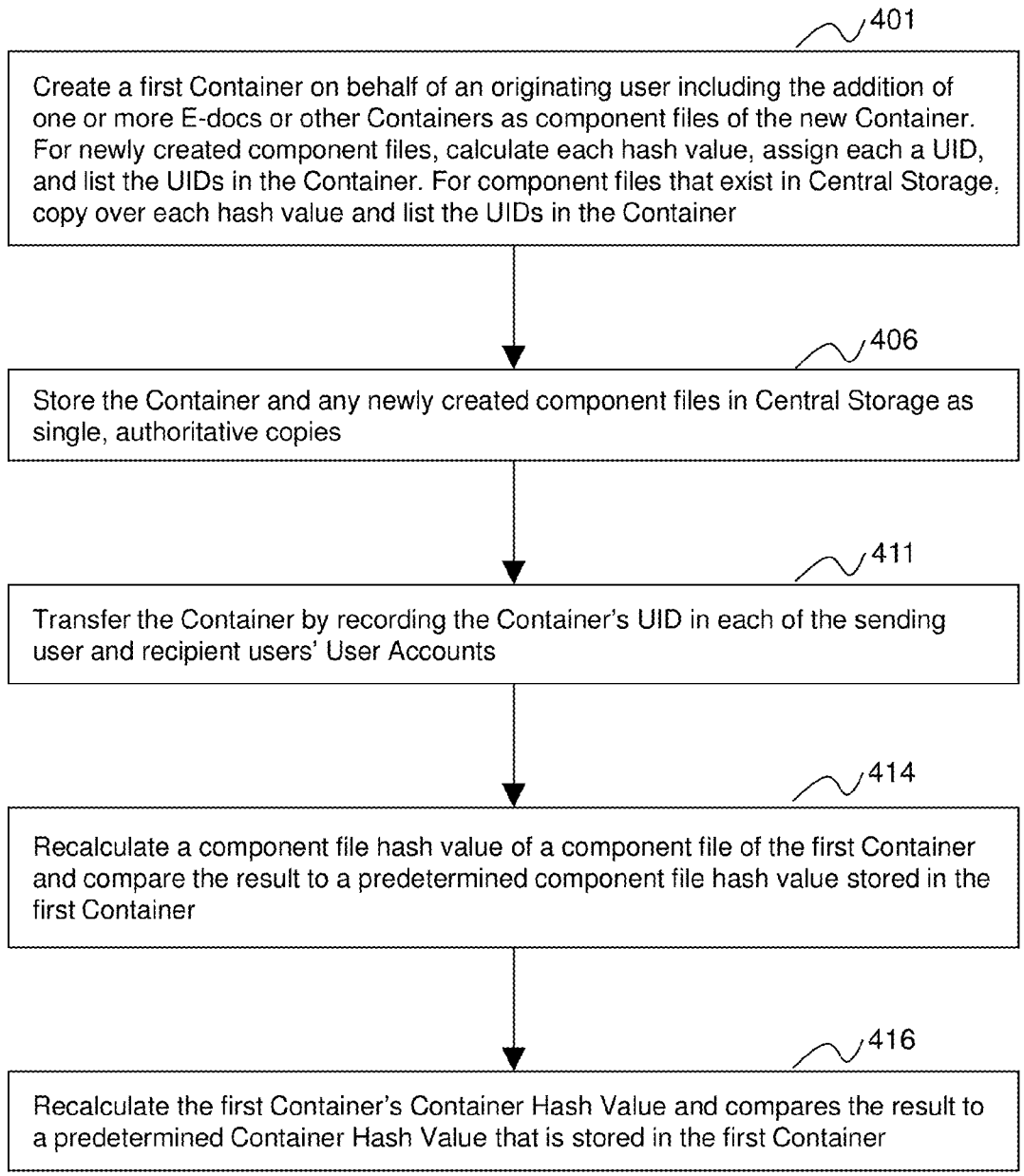
FIG. 4A illustrates a flow diagram of creating, storing, transferring and verifying a Container, in one embodiment.

FIG. 4A illustrates a flow diagram for creating, storing, transferring and verifying Containers, in one embodiment.

At block 401, the SDTS Server creates a first Container, capable of being nested as a component file of a second Container, on behalf of the first Container's originating user at the originating user's User Account. The creation of the first Container includes: the SDTS Server adding one or more E-docs or other Containers as component files of the new Container. If any component file is newly created, the SDTS Server can calculate the individual hash value of each newly created component file, and assign each newly created component file a UID. The SDTS Server can also list the UIDs as component files in the first Container, and if any component file already exists in Central Storage, the SDTS Server copies over the hash value of each existing E-doc or existing Container and lists the UID as a component file in the first Container. The creation of the first container can also include: adding various Attributes to first Container as specified by the sending user or SDTS Application, including but not limited to, a set of transfer instructions for the first Container identifying the first Container's originating user as the sender and a group of one or more receiving User Account UIDs; calculating and recording the first Container's Container Hash Value in the first Container; and assigning a UID to the first Container.

At block 406, the SDTS Server permanently stores, in Central Storage, an authoritative copy of the first Container and any newly created or uploaded component file(s) of the first Container.

At block 411, the SDTS Server transfers the first Container to the sender and recipient(s) through SDTS Mail by storing the first Container's UID at the SENT mail box of the Sender's User Account and the IN mail box of each of the first Container's one or more receiving User Account(s).

At block 414, the SDTS Server, on behalf of a receiving User Account, recalculates a component file hash value of a component file of the first Container and compares the result to a predetermined component file hash value stored in the first Container. A hash value match can constitute verification of the integrity of the component file.

At block 416, the SDTS Server, on behalf of a receiving User Account, recalculates the first Container's Container Hash Value and compares the result to a predetermined Container Hash Value that is stored in the first Container, and a hash value match constitutes verification of the integrity the first data storage container.

In one embodiment, a user can create and transfer a Container to his own User Account. The time stamp details of the Container can be used as proof of creation of the Container's contents at the specific date and time.

Container Nesting

In one embodiment, a Container cannot be altered with exception of the Container Notes upon assignment of a UID and being stored in Central Storage. Thus, for transfers of an existing Container, the SDTS Server generates a new Container with a new UID. The SDTS Server can nest the existing Container as a component file into the new Container, and the new Container can contain Attributes describing the event details and its association with the existing Container. The new Container can then be sent to the specified recipient(s).

Figure 3:
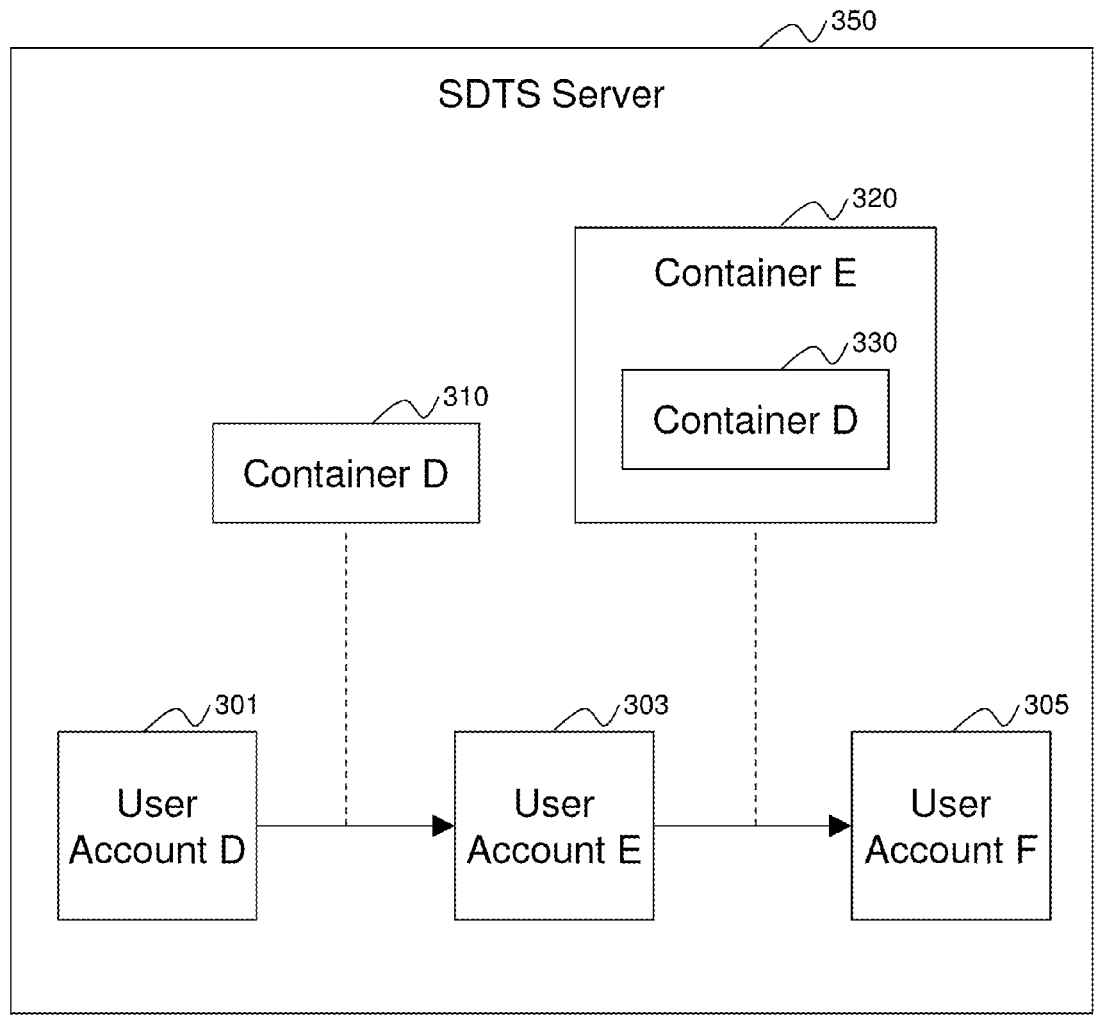
FIG. 3 illustrates a block diagram of nested Containers, in one embodiment.

FIG. 3 illustrates an example embodiment of how existing Containers are nested into new Containers. In the SDTS Server 350, a user from User Account D 301 transfers a Container D 310 to another User Account E 303. The SDTS Server 350 can record Container D's UID at User Account E 303. Because Container D 310 cannot be altered upon assignment of a UID, Container D 310 must be nested in a new Container E 320 in order to be further transferred in the SDTS. A user at User Account E 303 nests Container D's UID 330 in Container E 320 and sends Container E 320 to User Account F 305. The SDTS Server 350 can record Container E's UID at User Account F 305. A virtually infinite number of transfers may continue to occur. Each event can cause the existing Container's UID to be nested into a new Container for transfer.

Container Verification

In one embodiment, the SDTS can verify or contains means for verifying integrity of a Container against any unintentional or malicious alterations or file corruption by recalculating the Container Hash Value and comparing the result to a predetermined Container Hash Value that is stored in the Container. A hash value match can constitute verification of the Container's integrity.

In one embodiment, the SDTS Server can verify the integrity of a Container or an E-doc stored (i.e. previously downloaded to) outside the SDTS Server by recalculating its hash value and comparing the hash value against a hash value for a Container or E-doc stored in Central Storage. In another embodiment, the Container or E-doc stored (i.e. previously downloaded to) outside the SDTS Server is verified for its integrity by comparing it against a Container or E-doc stored in Central Storage with a bit-by-bit comparison.

Virtual Filing and Secured Nested Transactions

E-doc and Container files are stored in Central Storage as single, authoritative copies. When nesting E-docs and Containers as component files to a new Container, the SDTS Server uses the corresponding E-doc UIDs and Container UIDs to represent those files in the component file list. When Containers are transferred from user to user through SDTS Mail, the SDTS Server transfers the corresponding Container UIDs to the appropriate User Accounts in lieu of transferring the actual Container files. When a user accesses a Container or its underlying component files, the SDTS Server retrieves the files from Central Storage corresponding to the Container UID or E-doc UID. This forms a virtual filing infrastructure.

In one embodiment, the SDTS can enable multiple, chained transaction events. Because the SDTS Server maintains verifiable integrity for all E-docs and Containers and the virtual filing infrastructure allows E-docs and Containers to be referenced by new Containers, the SDTS can enable a series of secured, nested transactions to occur. Each new Container nests all prior E-docs and Containers used in preceding transaction events. In FIG. 2, Container Y's Container Hash Value 270 can be verified to ensure the integrity of Container Y 225 including its component files 235, component file hash values 250, and Attributes 265. With Container X 201 and E-doc A 220 securely nested in Container Y 225, the SDTS is able to provide secure, multiple, chained transaction events.

In one embodiment, when an E-doc UID or Container UID is referenced from an existing Container as a component file of a new Container, the SDTS Server can create an Attribute or Container Note in the new Container to describe the existing Container UID from where the component E-doc or Container is being referenced. Similarly, when a component file is newly created or uploaded to a new Container, the SDTS Server can create an Attribute or Container Note in the new Container to describe that the component file is newly created or uploaded. In another embodiment, Container Notes can be added to an existing Container to describe the UID of a new Container that references the existing Container or the existing Container's component files. These Attributes and Container Notes allow the SDTS Server to trace back to the Container from or to where a component file is referenced.

Transaction Authorizations

Transaction Authorizations allow users to authorize Container transactions. To provide a Transaction Authorization, a user authorizes the SDTS Server to generate an electronic signature for a specified Container. The electronic signature is generated based on the user's identifying information and the corresponding Container's Container Hash Value. The SDTS Server can further authenticate the authorizing user by verifying the electronic signature. In one embodiment, details of the Transaction Authorization are recorded in a transaction authorization log (Transaction Authorization Log) corresponding to the Container UID.

Verification of the electronic signature of a Transaction Authorization can prove a Container's integrity, the authorizing User Account, and the authorizing user's agreement to the transaction event details. In addition, verification of the electronic signature of a Transaction Authorization proves the integrity of all of the Container's underlying E-docs and Containers.

In one embodiment, the Transaction Authorization module can generate and verify electronic signatures and maintain the Transaction Authorization Log. Recorded information in the Transaction Authorization Log is permanent and consistently backed up.

In one embodiment, details of a pending Transaction Authorization, including identifying information of the authorizing user, identifying information of the one or more receiving users, identifying information for the one or more E-docs to which the electronic signature will be applied, date and time information from a running clock, Transaction Authorization reasons, warranties or terms of the transfer, and the type of electronic signature to be provided can be displayed to a user prior to providing his/her Transaction Authorization. Completing the Transaction Authorization implies that the user acknowledges and agrees to the Transaction Authorization event details. When a user provides a Transaction Authorization for a new Container, the Transaction Authorization event details are recorded as Attributes of the Container.

In one embodiment, an SDTS Application can set a requirement that requires users to provide Transaction Authorizations in order to perform transactions for those Application-specific Containers. If there does not exist a requirement to provide a Transaction Authorization, a user may proactively provide a Transaction Authorization when originating and sending the Container.

Figure 4B:
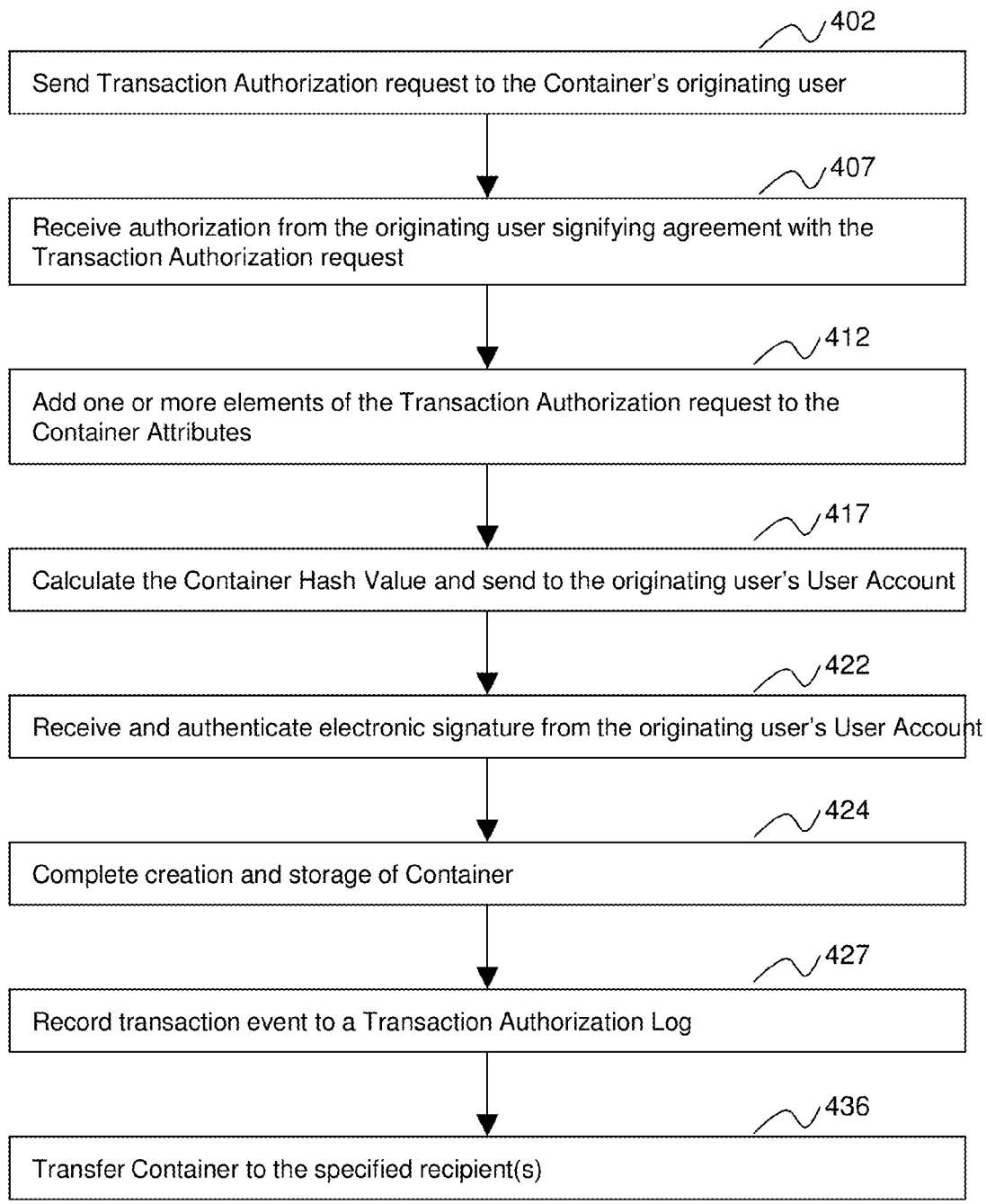
FIG. 4B illustrates a flow diagram of Transaction Authorization procedures, in one embodiment.

FIG. 4B illustrates a flow diagram for a Transaction Authorization within the SDTS, in one embodiment.

At block 402, the SDTS Server sends a Transaction Authorization request to a Container's originating user, and the transaction authorization request can include one or more elements of: the originating user's User Account UID; the one or more receiving user's User Account UIDs; the UID(s) of the one or more underlying files nested in the Container to which the Transaction Authorization applies; date and time information from a running clock; Transaction Authorization reasons; warranties; transaction terms; or a requested electronic signature authorization type.

At block 407, the SDTS Server receives authorization from the originating user for the Transaction Authorization request. The authorization can signify user agreement with the Transaction Authorization event details of the request.

At block 412, the SDTS Server adds, upon receiving the authorization from the originating user of the Container, one or more elements of the Transaction Authorization request including finalized date and time information to the Attributes of the Container.

At block 417, the SDTS Server calculates the Container Hash Value and sends the Container Hash Value to the originating user's User Account.

At block 422, the SDTS Server receives and authenticates an electronic signature from the originating user's User Account. The electronic signature may be generated based at least in part on identifying information of the originating user's User Account and the Container Hash Value.

At block 424, the STDS Server completes the creation of the Container by recording the Container Hash Value in the Container and assigning the Container a Container UID, and further stores the Container in Central Storage.

At block 427, the SDTS Server records the transaction event to a Transaction Authorization Log. The transaction event can include one or more of: the Container UID, the Container Hash Value, the electronic signature, or one or more elements of the Transaction Authorization request including the finalized date and time information.

At block 436, the SDTS Server transfers the Container to the specified recipient(s).

In one embodiment, depending on a desired or required level of security for the Container, the electronic signature type for a Transaction Authorization is one or more of, but is not limited to: a stored event based on a response to an Email confirmation link or an entered password or passcode; biometric identification; Salted Password; or Digital Signature; or a combination of more than one of these methods.

Transaction Authorization by Stored Event

In one embodiment, the Transaction Authorization is provided by means of a stored event where the Container's sending user performs an authenticating action or provides a form of authentication in order to agree to and complete a Transaction Authorization.

In one embodiment, the authenticating action can be a response to an Email confirmation link, and upon requesting the sending user to provide his/her Transaction Authorization, the SDTS Server generates an Email with a dedicated confirmation link to be sent to the sending user's preregistered Email address. Upon the sending user logging onto his/her Email account, retrieving said Email, and clicking on said Email confirmation link to connect back to the SDTS Server, the SDTS Server records the event alongside the Container Hash Value as the Transaction Authorization in the Transaction Authorization Log.

In another embodiment, the sending user provides a password to the SDTS Server to authenticate himself and generate the Transaction Authorization. The provided password is compared to a preregistered password at the SDTS Server and a match constitutes authentication. The password can either be the same or different password used for User Authentication. The SDTS Server records the stored password event alongside the Container Hash Value as the Transaction Authorization in the Transaction Authorization Log.

In another embodiment, the SDTS Server sends a unique passcode to a token registered to the sending user (i.e. a text message to the sending user's phone number; an Email to the sending user's Email address; a registered smartcard token). Upon receiving the passcode, the sending user provides the passcode to the SDTS Server to authenticate himself and generate the Transaction Authorization. The SDTS Server records the stored passcode event alongside the Container Hash Value as the Transaction Authorization in the Transaction Authorization Log.

Transaction Authorization by Biometric Identification

In one embodiment, the Transaction Authorization is provided by means of biometric identification in order to agree to and complete a Transaction Authorization. Types of biometric identification can include, but are not limited to: fingerprints, facial recognition, and voice recognition. The biometric identification provided by the user can be compared to information previously stored at the Transaction Authorization Module. A match can authenticate the user to complete his/her Transaction Authorization.

Transaction Authorization by Salted Password

In one embodiment, a Transaction Authorization is provided by means of a Salted Password from the Container originator. To generate the Salted Password, a user can install a Salted Password generation program at the SDTS Client. The user's password can be registered and stored at the Transaction Authorization Module.

Figure 4C:
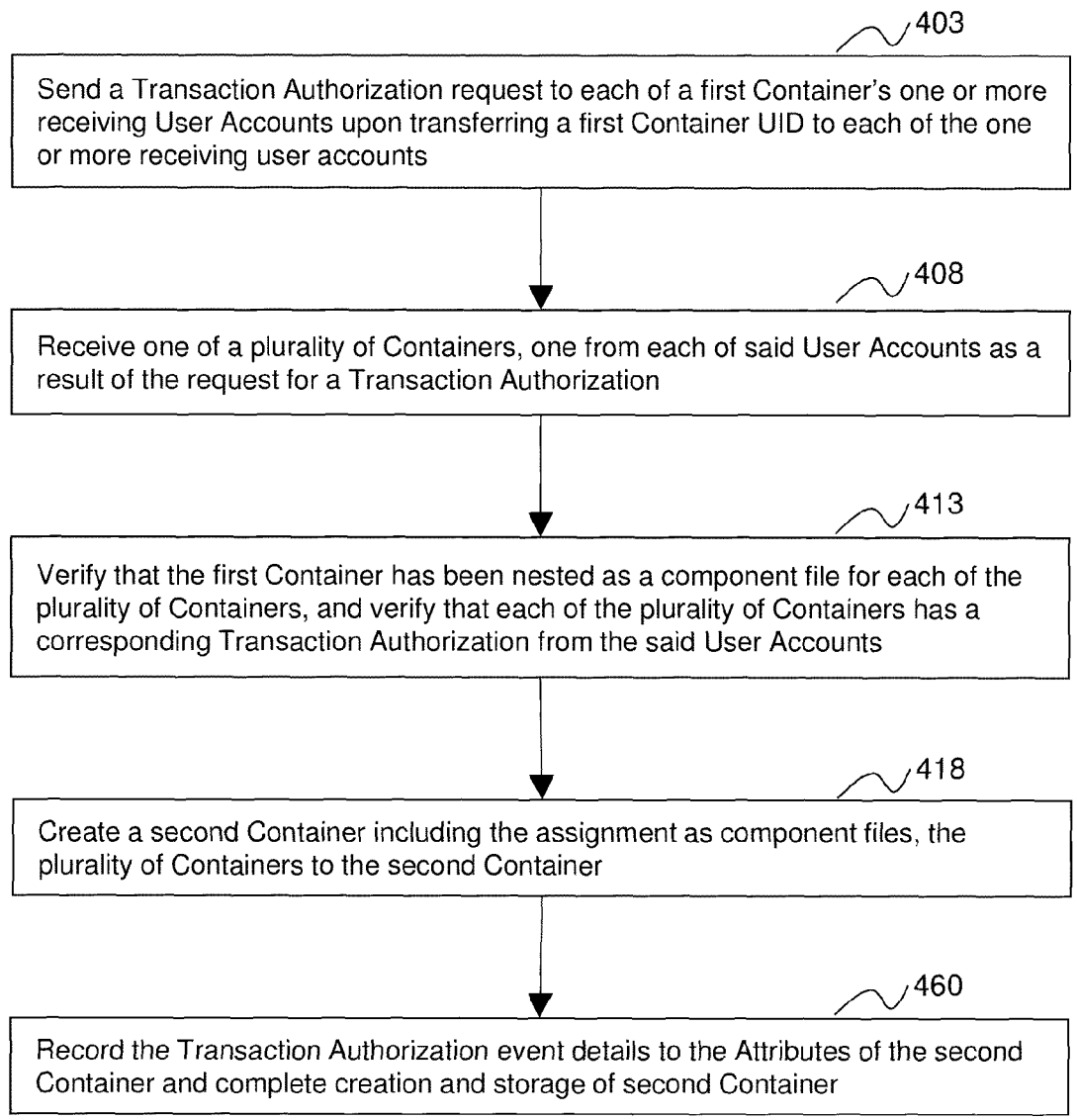
FIG. 4C illustrates a flow diagram of Parallel Transaction Authorization procedures, in one embodiment.
Figure 4D:
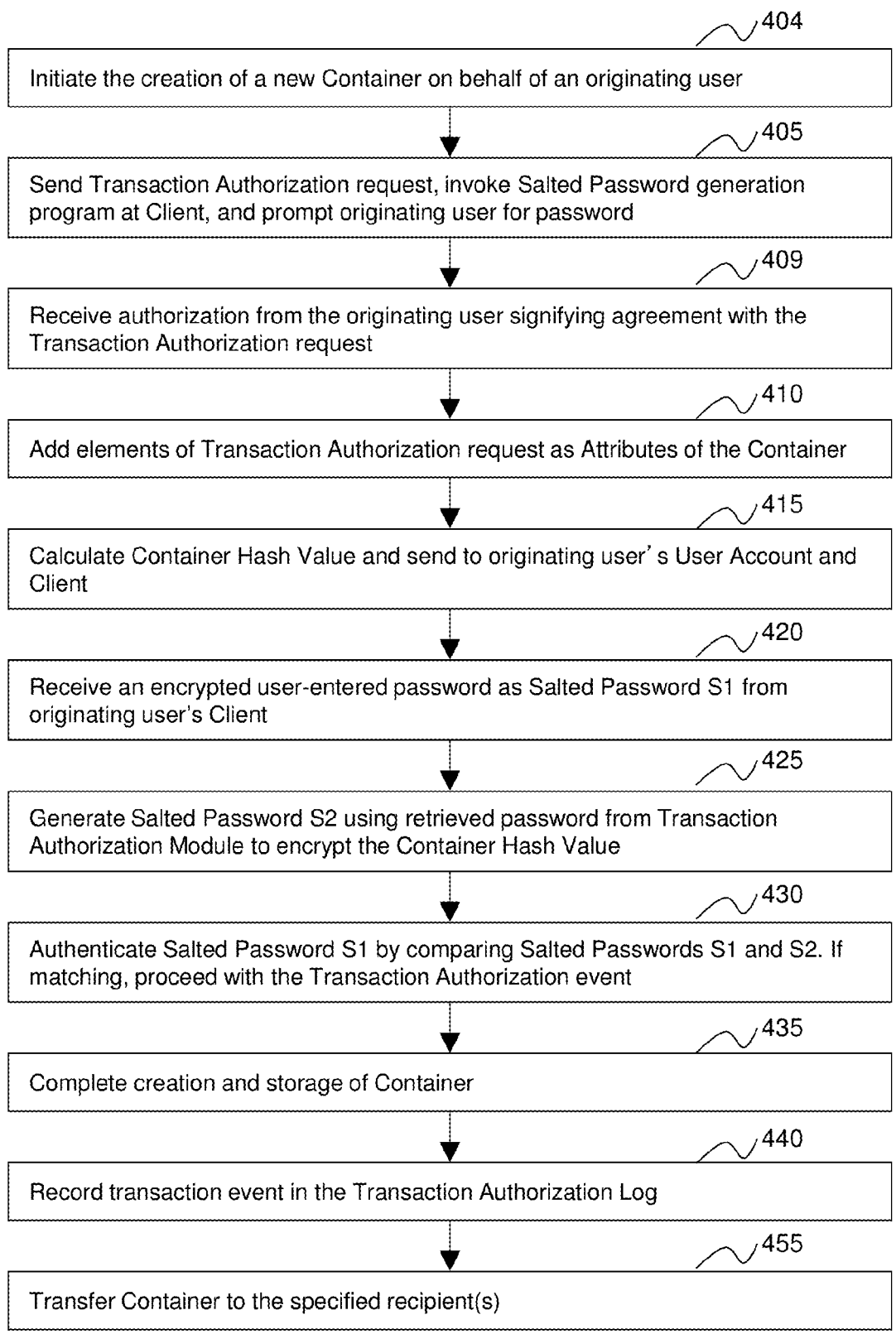
FIG. 4D illustrates a flow diagram of a Transaction Authorization by Salted Password procedures, in one embodiment.

FIG. 4D demonstrates one embodiment of the procedures for a Transaction Authorization by Salted Password. At block 404, the SDTS Server initiates the creation of a new Container on behalf of the Container's originating user.

At block 405, the SDTS Server sends a Transaction Authorization request to the Container's originating user. The Transaction Authorization request can include one or more elements of: the authorizing user's User Account UID, the receiving users' User Account UID(s), the UIDs of the one or more underlying files nested in the Container to which the Transaction Authorization applies, warranties, transaction terms or Transaction Authorization reasons, a running clock displaying the date and time, and a statement that the Container is to be authorized with a Salted Password. The SDTS Server can further invoke the Salted Password generation program installed at the Client, and prompts the user to enter his/her password.

At block 409, the SDTS Server receives an authorization from the originating user for the Transaction Authorization request upon the originating user entering his/her password, and the authorization signifies agreement with the Transaction Authorization event details of the request.

At block 410, the SDTS Server adds, upon receiving the authorization from the originating user, one or more elements of the Transaction Authorization request including finalized data and time information to the Attributes of the Container.

At block 415, the SDTS Server calculates the Container Hash Value and sends the Container Hash Value to the originating user's User Account. The Container Hash Value is retrieved from the originating user's User Account to the originating user's Client.

At block 420, the SDTS Server receives an encrypted user-entered password as a Salted Password S1. The Salted Password generation program at the user's Client uses the user-entered password as identifying information of the originating user to encrypt the received Container Hash Value as a Salted Password S1 and sends the Salted Password S1 back to the Transaction Authorization Module.

At block 425, the SDTS Server generates Salted Password S2. Salted Password S2 is generated by the Transaction Authorization Module using the originating user's previously registered password retrieved from the Transaction Authorization Module database to encrypt the Container Hash Value.

At block 430, the SDTS Server authenticates Salted Password S1 by comparing Salted Passwords S1 and S2. If matching, proceed with the Transaction Authorization event.

At block 435, the SDTS Server completes the creation of the Container by recording the Container Hash Value in the Container and assigning the Container a Container UID, and further stores the Container in Central Storage.

At block 440, the SDTS Server records a transaction event to the Transaction Authorization Log. The transaction event includes one or more of: the Salted Password, the Container UID, the Container Hash Value, and one or more elements of the Transaction Authorization request including the finalized date and time information.

At block 455, the SDTS Server transfers the Container to the specified recipient(s).

Transaction Authorization by Digital Signature

In one embodiment, a Transaction Authorization is provided by means of a Digital Signature from the Container originator. To generate the Digital Signature, a user can install a Digital Signature generation program and keep a Private Key at the SDTS Client. The paired Public Key can be registered and stored at the Transaction Authorization Module.

Figure 5A:
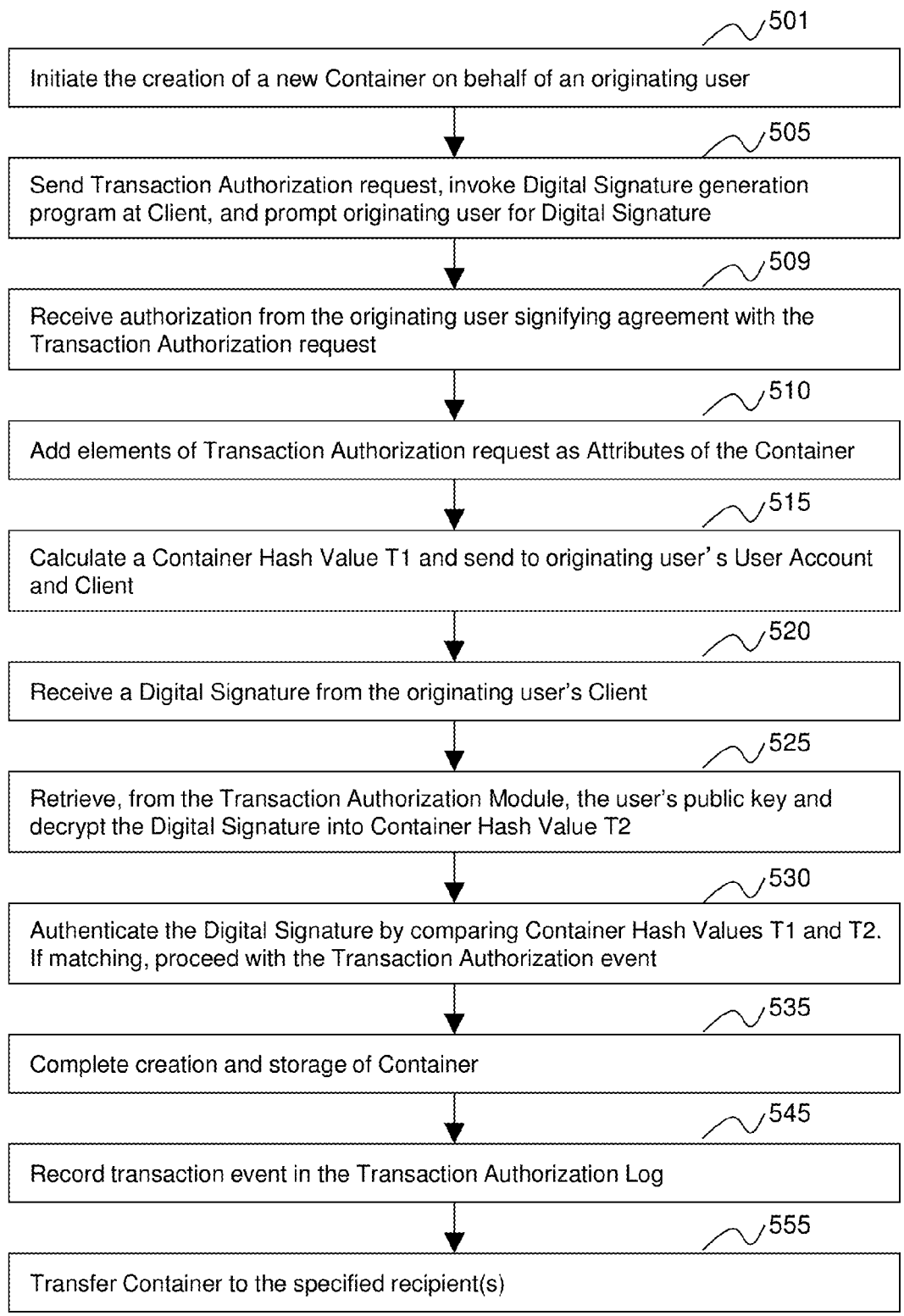
FIG. 5A illustrates a flow diagram of a Transaction Authorization by Digital Signature procedures, in one embodiment.

FIG. 5A shows one embodiment of the procedures for a Transaction Authorization by Digital Signature. At block 501, the SDTS Server initiates the creation of a new Container on behalf of the Container's originating user.

At block 505, the SDTS Server sends a Transaction Authorization request to the Container's originating user. The Transaction Authorization request can include one or more elements of: the authorizing user's User Account UID; the receiving user's User Account UID; the UIDs of the one or more underlying files nested in the Container to which the Transaction Authorization applies; any warranties; transaction terms or Transaction Authorization reasons; a running clock displaying the date and time; and a statement that the Container is to be authorized with a Digital Signature. The SDTS Server further invokes the Digital Signature generation program installed at the Client, and prompts the user to provide his private key in order to generate a digital signature.

At block 509, the SDTS Server receives an authorization from the originating user for the Transaction Authorization request upon the originating user providing his/her private key for generating a Digital Signature Transaction Authorization at the Client. The authorization can signify agreement with the Transaction Authorization event details of the request.

At block 510, the SDTS Server adds, upon receiving the authorization from the originating user, one or more elements of the Transaction Authorization request including finalized date and time information as Attributes of the Container.

At block 515, the SDTS Server calculates the Container Hash Value T1 and sends the Container Hash Value T1 to the originating user's User Account. The Container Hash Value is retrieved from the originating user's User Account to the originating user's Client.

At block 520, the SDTS Server receives a Digital Signature from the originating user. The Digital Signature generation program at the user's Client uses the user's private key as identifying information of the originating user to encrypt the received Container Hash Value T1 as a Digital Signature and sends the Digital Signature back to the Transaction Authorization Module.

At block 525, the SDTS Server retrieves the user's paired public key from the Transaction Authorization Module to decrypt the received Digital Signature into Container Hash Value T2.

At block 530, the SDTS Server authenticates the Digital Signature by comparing Container Hash Values T1 and T2. If matching, proceed with the Transaction Authorization event.

At block 535, the STDS Server completes the creation of the Container by recording the Container Hash Value in the Container and assigning the Container a Container UID, and further stores the Container in Central Storage.

At block 545, the SDTS Server records a transaction event to the Transaction Authorization Log, and the transaction event can include one or more of: the Digital Signature, the Container UID, the Container Hash Value, and one or more elements of the Transaction Authorization request including the finalized date and time information.

At block 555, the SDTS Server transfers the Container to the specified recipient(s).

Transaction Authorizations by Digital Signatures using a public and private key pair mechanism provides strong, non-repudiable proof of the originator's identity. A Digital Signature also proves the direct association to the Container Hash Value. In one embodiment, private keys can be stored in a user's token device providing an extra level of User Account security in addition to User Authentication.

Parallel Transaction Authorizations

Parallel Transaction Authorizations is a means to collect Transaction Authorizations from multiple users in parallel as opposed to sequentially. For a group of one or more users who have received a first Container and who are requested to provide their individual Transaction Authorizations for the first Container, a new Container is created for each of the said multiple users. Each new Container can nest the first Container as a component file and each of the multiple users can provide Transaction Authorizations to their corresponding new Container. The new Containers can be collected and nested together in another new Container in order to combine all Transaction Authorizations.

FIG. 4C shows the procedures for Parallel Transaction Authorizations in one embodiment.

At block 403, the SDTS Server sends a Transaction Authorization request to each of a first Container's one or more receiving User Accounts upon transferring a first Container UID to each of the one or more receiving user accounts.

At block 408, the SDTS Server receives a plurality of Containers, one from each of said User Accounts as a result of the request for a Transaction Authorization.

At block 413, the SDTS Server verifies that the first Container has been nested as a component file for each of the plurality of Containers. Further, the SDTS Server verifies that each of the plurality of Containers has a corresponding Transaction Authorization from the said User Accounts by checking the Transaction Authorization Log.

At block 418, the SDTS Server creates a second Container including the assignment, as component files, the plurality of Containers to the second Container.

At block 460, the SDTS Server completes the creation of the second Container by recording the Parallel Transaction Authorization event details, including but not limited to, a statement specifying the involved Container UIDs and the User Account UIDs providing their Transaction Authorizations for the first Container, to the Attributes of the second Container, recording the Container Hash Value in the Container, and assigning the Container a Container UID. The SDTS Server further stores the Container in Central Storage.

Figure 6:
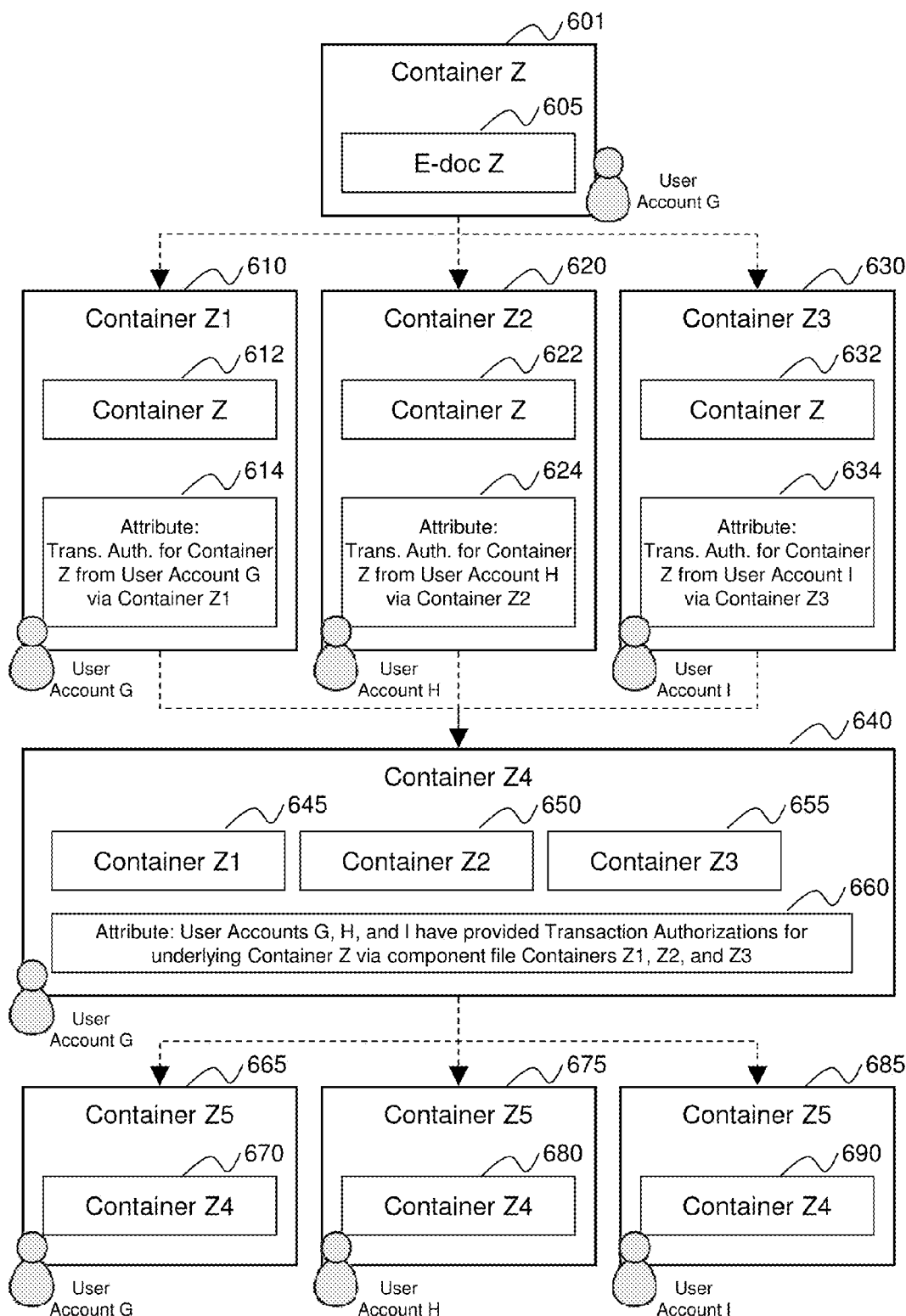
FIG. 6 illustrates a block diagram of Parallel Transaction Authorizations, in one embodiment.

In another example embodiment shown in FIG. 6 for Parallel Transaction Authorizations, a user from User Account G originates a Container Z 601 that contains a component file E-doc Z 605. The user from User Account G can invoke the Parallel Transaction Authorization means to collect Transaction Authorizations for Container Z 601 from multiple User Accounts including his own (e.g. User Accounts G, H, and I) in parallel to ultimately create a Container Z4 640 to combine all of the Transaction Authorizations.

First, User Account G invokes the Parallel Transaction Authorization means and specifies Container Z 601 as the Container to be sent to User Accounts G, H, and I in order to collect their Transaction Authorizations.

The SDTS Server sends Container Z 601 to User Accounts G, H, and I through SDTS Mail.

The users at User Accounts G, H, and I create Containers Z1 610, Z2 620, and Z3 630 and individually send them back to User Account G through SDTS Mail. Containers Z1, Z2, and Z3 each reference the original Container Z's Container UID 612, 622, 632 as a component file and have an Attribute of the Transaction Authorization event 614, 624, and 634 stating that the Transaction Authorization by User Account G, H, or I is for Container Z provided via Container Z1, Z2, or Z3, respectively.

The SDTS Server verifies if all Containers Z1 610, Z2 620, and Z3 630 have been received, have the designated users' (User Accounts G, H, and I) Transaction Authorizations recorded at the Transaction Authorization Log, and contain the same Container Z as a component file (612, 622, and 632). If confirmed, the Parallel Transaction Authorization means generates a new Container Z4 640 to nest Containers Z1 645, Z2 650, and Z3 655 as component files. The new Container Z4 contains an Attribute 660 that describes the event details (e.g. User Accounts G, H, and I have provided Transaction Authorizations for underlying Container Z via component file Containers Z1, Z2, and Z3).

The Parallel Authorization means distributes Container Z5 665, 675, and 685 which has nested Container Z4 670, 680, and 690 to User Accounts G, H, and I. Each user can independently verify that Container Z5 665, 675, and 685 has nested Containers Z4 670, 680, and 690, that Container Z4 670, 680, and 690 has nested all of the authorized Containers Z1, Z2, and Z3. Z1, Z2, and Z3 respectively contain User Account G's, H's, and I's Transaction Authorizations, and that Containers Z1, Z2, and Z3 each have nested the original Container Z which contains E-doc Z.

Single Ownership Control

Containers can be owned by specified users through SDTS Single Ownership Control, and a Container can be owned by one User Account at any given time. An owner of a Container can access the Container and transfer ownership of the Container to a new User Account.

Figure 5B:
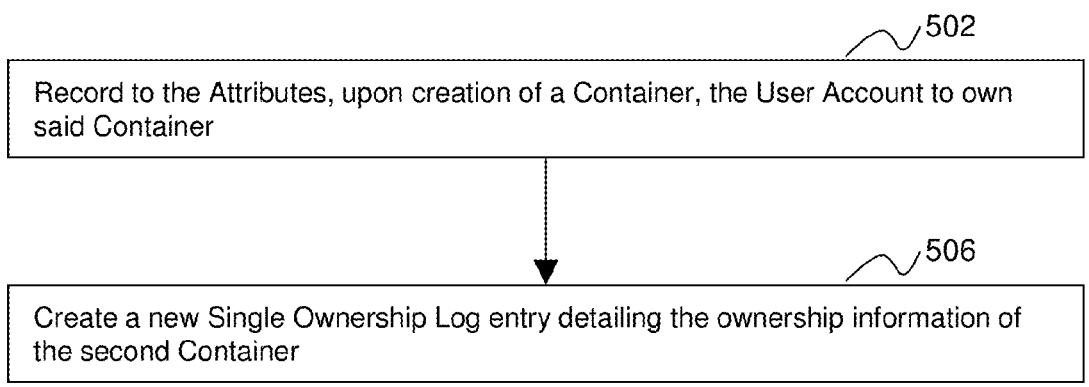
FIG. 5B illustrates a flow diagram of assigning Container ownership for Single Ownership Control, in one embodiment.

The SDTS Server provides a Single Ownership Control means to maintain a record of ownership in a Single Ownership Control Log as well as in the corresponding Container's Attributes. FIG. 5B shows in one embodiment a new Container under Single Ownership Control upon creation of the new Container.

At block 502, upon creating a new Container, the SDTS Server records to the Attributes of the Container, authorized ownership information specifying a User Account to own the Container. The User Account can be one of the Container's one or more receiving User Accounts.

At block 506, the SDTS Server adds an entry to the Single Ownership Control Log specifying one or more of, but not limited to, said Container's UID, said Container owner's User Account UID as authorized ownership information, date and time information, and the sending and receiving users' User Account UIDs.

Figure 5C:
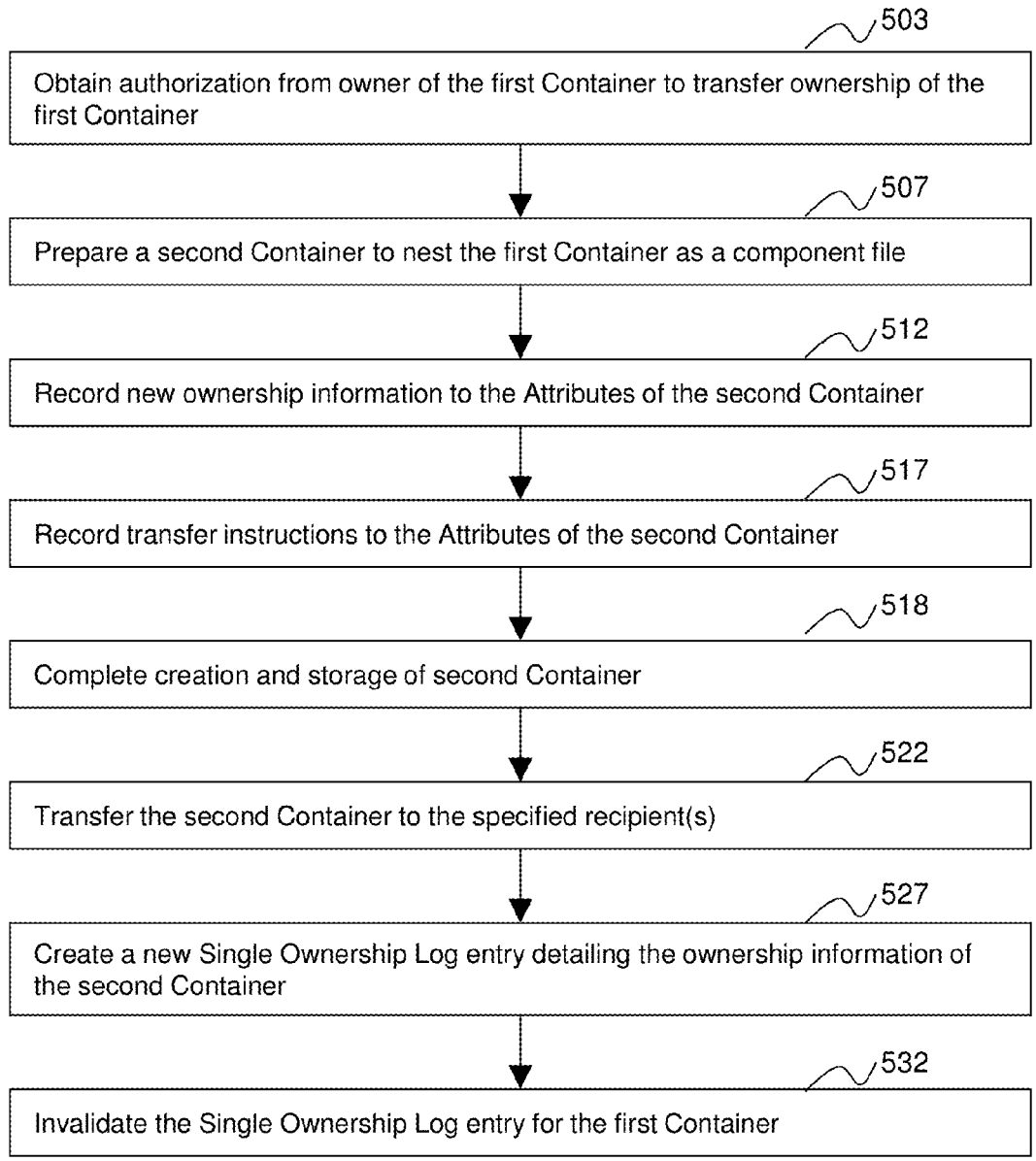
FIG. 5C illustrates a flow diagram of transferring ownership of a Container under Single Ownership Control, in one embodiment.

FIG. 5C shows one embodiment of the procedures for transferring ownership of a first Container under Single Ownership Control. At block 503, the SDTS Server obtains authorization from the owner of the first Container to transfer ownership of the first Container. In some embodiments, the owner must provide a Transaction Authorization.

At block 507, the SDTS Server creates a second Container by nesting the first Container as a component file of the second Container.

At block 512, the SDTS Server further records, as Attributes of the second Container, details including, but not limited to: the new authorized ownership information identifying a User Account UID as the owner of the second Container, the User Account UID of the owner of the first Container authorizing the ownership transfer, the first Container UID of which ownership is being transferred, and the date and time of transfer.

At block 517, the SDTS Server further records, as Attributes of the second Container, a set of transfer instructions for the second Container identifying the second Container's originator as the sending User Account and one or more receiving User Accounts. The new owner of the second Container can be one of the second Container's one or more receiving User Accounts.

At block 518, the SDTS Server completes the creation of the Container by recording the Container Hash Value in the Container and assigning the Container a Container UID, and further stores the Container in Central Storage.

At block 522, the SDTS Server executes the transfer instructions of the second Container by storing the UID of the second Container in each of the second Container's one or more receiving user(s)' User Account(s).

At block 527, the SDTS Server creates a new Single Ownership Control Log entry including one or more of, but not limited to, the second Container's UID, the second Container owner's User Account UID as the authorized ownership information, the first Container's UID, the first Container owner's User Account UID, and the second Container's creation date and time information.

At block 532, the SDTS Server invalidates the Single Ownership Control Log entry for the first Container.

In one embodiment, upon an ownership transfer request, the SDTS Single Ownership Control means first confirms that the User Account requesting an ownership transfer for the first Container is the authorized owner as recorded in the Single Ownership Control Log.

Figure 7:
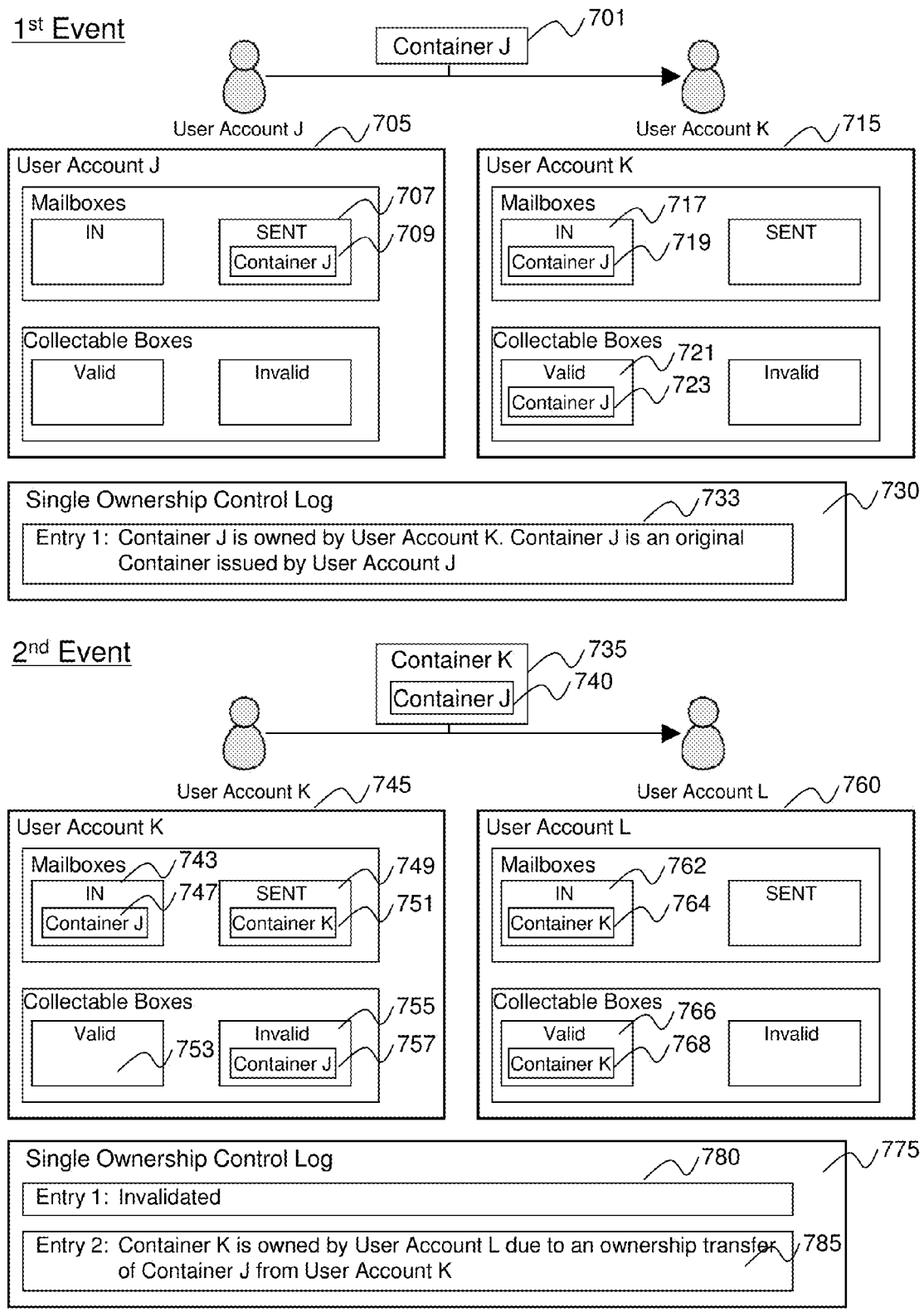
FIG. 7 illustrates a block diagram of assigning and transferring Container ownership, in one embodiment.

FIG. 7 provides another example embodiment of transferring ownership for a Container under Single Ownership Control. In the first event, a Service Provider at User Account J 705 issues a new Container J 701 to User Account K 715. In one embodiment, Container J 701 includes an ownership Attribute.

Upon transferring Container J 701, the SDTS Server can record the UID for Container J 709 to User Account J's "SENT" Mailbox 707. The SDTS Server can also record the UID for Container J 719 to User Account K's "IN" Mailbox 717. The STDS Server can also record the UID for Container J 723 to User Account K's Application-specific "Valid" Collectable Box 721.

The SDTS Server records a first entry 733 in the Single Ownership Control Log 730. The entry can classify Container J as an original Container issued by User Account J and record the status of User Account K owning Container J.

In a second event, the SDTS Server enables User Account K 745 to perform an ownership transfer of Container J by transferring a new Container K 735 nesting Container J 740 to User Account L 760. In one embodiment, Container K 735 can include an Attribute stating the ownership transfer event.

Upon transferring Container K 735, the SDTS Server checks that User Account K's "IN" Mailbox 743 retains the UID for Container J 747 and records the UID for Container K 751 in User Account K's "SENT" Mailbox 749. Container J's UID is removed from User Account K's "Valid" Collectable Box 753, and Container J's UID 757 is recorded in User Account K's "Invalid" Collectable Box 755.

The SDTS Server records the UID for Container K 764 to User Account L's "IN" Mailbox 762. The SDTS Server further records the UID for Container K 768 to User Account L's "Valid" Collectable Box 766.

The SDTS Server invalidates the entry describing the ownership for Container J 780 within the Single Ownership Control Log 775. The SDTS Server further adds a second entry 785 to the Single Ownership Control Log. The second entry can specify that Container K is owned by User Account L due to an ownership transfer of Container J from User Account K.

In one embodiment, an SDTS Application can require the user of User Account K to provide a Transaction Authorization for Container K in order to transfer the ownership of Container J.

Value Change

Value-bearing Containers are Containers with Attributes specifying numerical value for the purpose of commercial transactions. Value-bearing Containers are generally under Single Ownership Control. In one embodiment, the Attributes of a Container contain a numerical value associated with the Container, and upon a change of ownership the numerical value is copied exactly or converted to a new numerical value in the Attributes of the new Container.

The SDTS Server provides an SDTS Value Change means to facilitate the use of value-bearing Containers in transactions by breaking a value-bearing Container into two new value-bearing Containers, one carrying the value necessary for a payment due to the payee and the other carrying the value remaining as change returned back to the payer.

Figure 8:
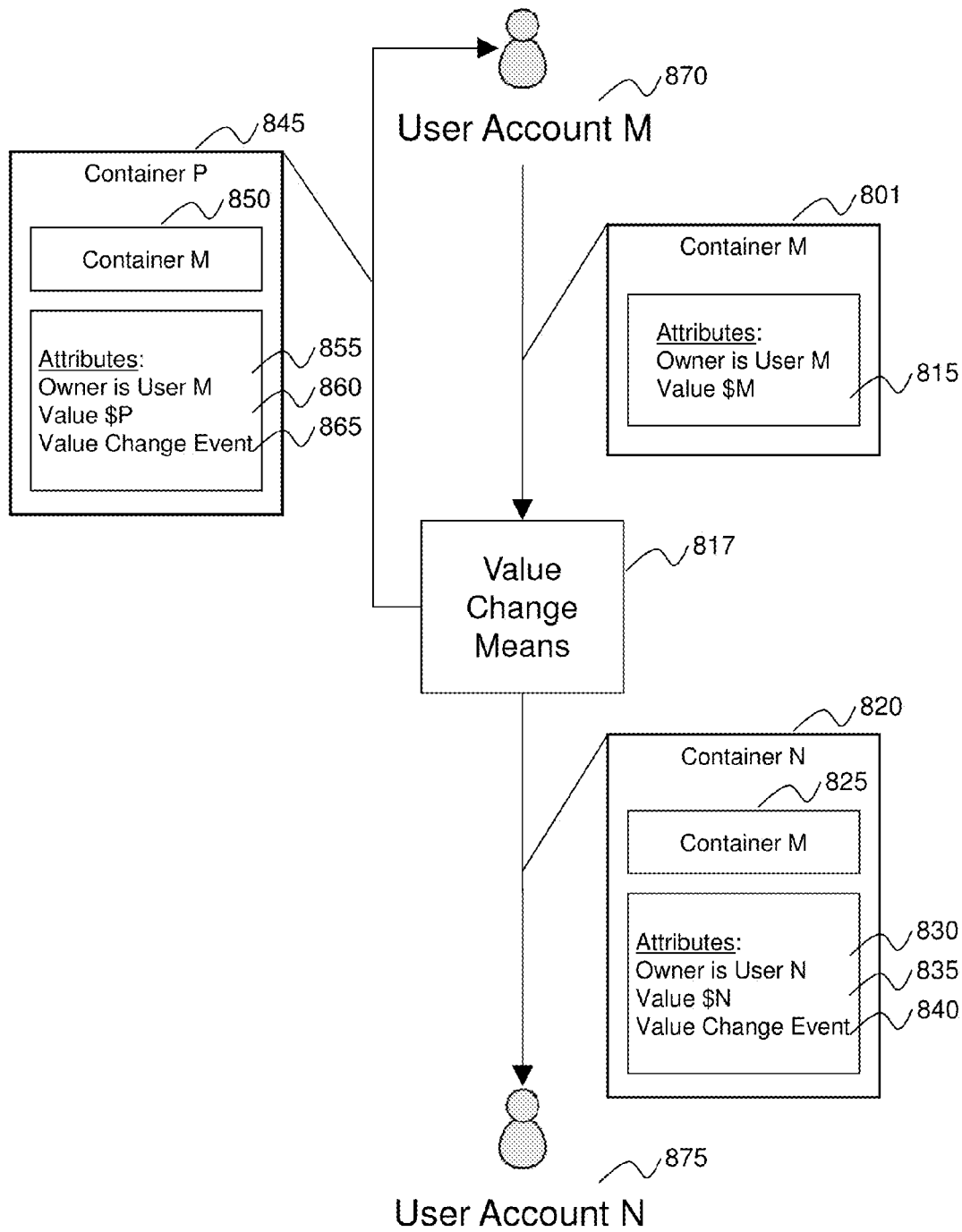
FIG. 8 illustrates a block diagram of value-bearing Containers and the Value Change means, in one embodiment.

FIG. 8 illustrates an example embodiment of SDTS Value Change means. User Account M 870 chooses a Container M 801 with Value $M 815 as a payment to User Account N 875. The actual required payment to User Account N is Value $N. If Value $M 815 is greater than Value $N (i.e. $M>$N), SDTS Value Change means 817 can be used to break Container M 801 into two new value-bearing Containers: the first is Container N 820 carrying the value of payment due $N 835 to be sent to User Account N 875, and the second is Container P 845 carrying the remaining value $P 860 as change to be returned back to User Account M 870. The value $P 860 can be calculated as $P=$M−$N.

Both Container N 820 and Container P 845 nest Container M 825 and 850 as a component file and both Container N 820 and Container P 845 contain an Attribute 840 and 865 stating the payment and value change event. For example, the Attribute can specify that User Account M has used Container M with Value $M to pay User Account N for the amount of Value $N with Container N, and a new Container P of value $P, where $P=$M−$N, is generated as change to User Account M.

Container N 820 contains an Attribute 830 specifying User Account N as the receiver and owner of Container N 820 and an Attribute 835 detailing Value $N for Container N 820.

Container P 845 contains an Attribute 855 specifying User Account M as the receiver and owner of Container P 845 and an Attribute 860 detailing Value $P for Container P 845. In one embodiment, each of the Containers M, N, and P can be under Single Ownership Control. Upon completion of the Value Change means, the SDTS Server can invalidate a previously recorded first entry in the Single Ownership Control Log specifying User Account M as the owner of Container M and records a second entry specifying User Account N as the owner of new Container N and further records a third entry specifying User Account M as the owner of new Container P.

As illustrated in FIG. 8, if Value $M 815 is equal to Value $N 835 (i.e. $M=$N), Container M 801 can be nested by Container N 820 for the payment to User Account N, and the payment and value change event Attribute 840 can state that User Account M has used Container N nesting Container M with Value $M to pay User Account N. In this embodiment, there will be no Container P 845 with the change Value $P 860 to be created and returned back to User Account M 870.

All transaction-related Containers can be independently verified by the SDTS for their integrity and transaction activity.

SDTS Editor

In one embodiment, the SDTS Server can provide an SDTS Editor, which can be used to display, create, and edit E-docs in certain file formats. The SDTS Editor can support multiple media types including but not limited to images, text, graphic shapes and symbols, hand writing or hand drawing entries, audio, and video. The SDTS Editor can provide a graphic user interface for SDTS Users to create E-docs and an API for SDTS Applications to generate Application-specific E-docs.

In one embodiment, the SDTS Editor is capable of converting certain E-doc file formats to a compatible E-doc file format that the SDTS Editor can open, display, and enable users to edit.

In one embodiment, SDTS enables SDTS Applications to access the SDTS Editor in order to generate Application-specific E-docs and Containers. Upon detection of user access to Application-specific E-docs or Containers, the SDTS Server can call the appropriate SDTS Application to operate on the Application-specific E-docs or Containers, or alternatively, call the SDTS Editor to open, display, or edit them accordingly.

In one embodiment, the SDTS Editor also supports a multitude of user tools including color alterations and transparency, website link insertion, text boxes, assignable fields for specific types of data Attributes (e.g., numerical value), blank checkboxes and blank form entry fields for receiving parties to input data for those assigned fields, screen shot snipping and multiple page creation.

In one embodiment, the SDTS Editor can be implemented as a canvas-based graphical tool such that text boxes, graphical objects, image objects, audio or video plug-ins, hand drawing entries, and other objects can be arbitrarily placed on the canvas, associated with each other, and layered accordingly.

Figure 9:
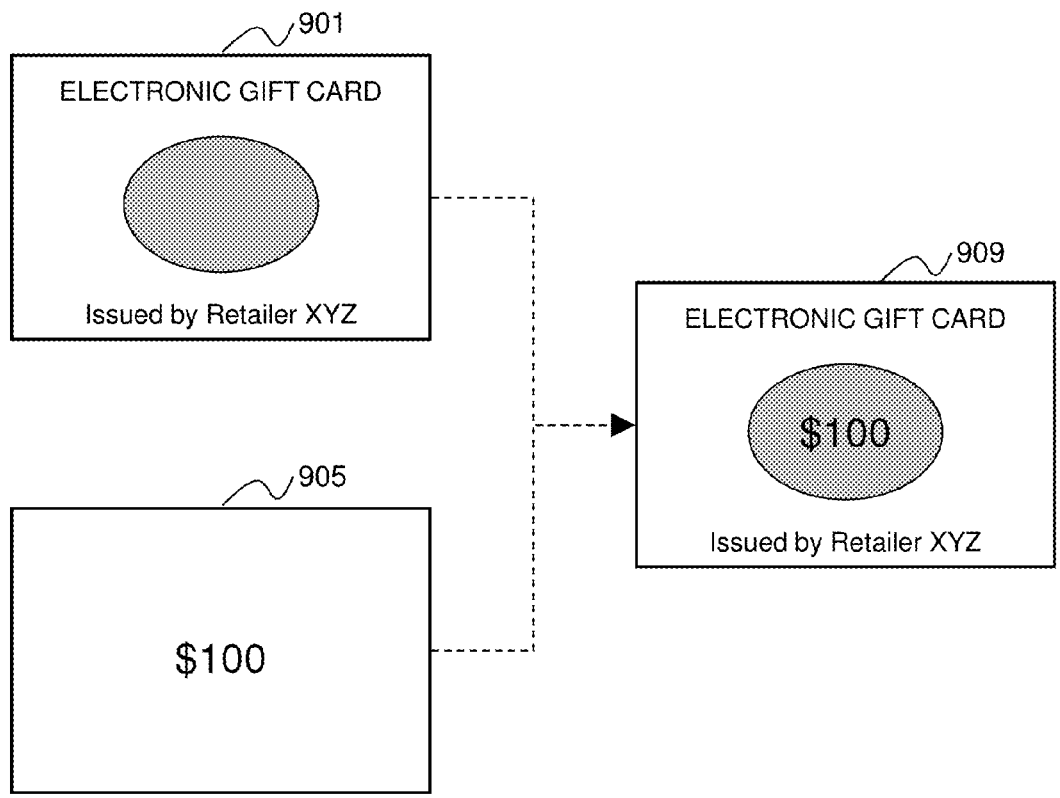
FIG. 9 illustrates a block diagram of Files Overlap Display, in one embodiment.

In one embodiment example shown in FIG. 9, a Files Overlap Display feature is incorporated into the SDTS Editor to enable a user or SDTS Application to create an E-doc as a foreground layer 905 which, when retrieved for viewing, will always be displayed on top of another existing E-doc background layer 901 on the same canvas. In one embodiment, both E-doc 905 and E-doc 901 are underlying files of a same Container.

First, the user or SDTS Application can use the SDTS Editor to layout the specified, existing E-doc 901 as the background layer and use the SDTS Editor to make new entries on one or more foreground layers of the same canvas. The new entries on the foreground layer(s) create a new E-doc 905. The SDTS Server can generate a new Container to contain both E-doc 905 and E-doc 901 as component files. The SDTS Server can add a Files Overlap Display Attribute to the Container that specifies E-doc 905 to be under Files Overlap Display control, and E-doc 901 as the display background file. When a user views E-doc 905, the SDTS Server can follow the Files Overlap Display Attribute specified in the Container to automatically invoke the SDTS Editor and retrieve E-doc 901 to be displayed as a background layer and E-doc 905 as the foreground layer on a same canvas. The complete image 909 is presented to the user.

This Files Overlap Display feature allows the existing E-doc 901 to remain independently secure in the Container and separately verifiable from E-doc 905. Examples of applications that can take advantage of the Files Overlap Display feature include, but are not limited to, markup entries and Signature Marks. The Files Overlap Display feature makes it possible that an E-doc can be continuously transferred in nested transactions while newly updated information in a later transaction event can be displayed as a foreground layer on top of an E-doc from an earlier transaction.

In one embodiment, the SDTS Editor provides markup tools for users that include a text box, highlighter, and other mark up notations. All markup entries made by a user together make up one E-doc V1, which is displayed as an overlapping foreground layer over another existing background E-doc V2. A new Container is created and the markup entries E-doc V1 and existing E-doc V2 are component files of the Container. The new Container can include a Files Overlap Display Attribute specifying that the markup entries file E-doc V1 to be displayed as a foreground layer over the specified background layer E-doc V2.

In one embodiment, the SDTS Editor provides a Signature Mark tool which enables users to select and lay out one or more signatures, logos, stamps, corporate titles, graphical seals or other objects of the like as foreground layers over an existing E-doc V4. The Signature Marks are combined as a new E-doc V3. The SDTS can set a Files Overlap Display Attribute in the Container, nesting both E-doc V3 and E-doc V4. A user accessing the Container sees the signature marks E-doc V3 displayed over E-doc V4. The integrity of E-doc V3, E-doc V4, and the Container can be independently verified.

Mail Pull

In one embodiment, the SDTS Server provides SDTS Mail Pull means to enable User Accounts to pull a Container from the Container originator's User Account to their own User Accounts. In one embodiment, a Container originator optionally sets an Attribute of the Container specifying the User Accounts (e.g. specific User Accounts or all User Accounts) who are qualified to pull the Container. In another embodiment, a password can be optionally specified in the Container Attribute. The password can be communicated to authorized users and is a requirement for those User Accounts to pull the Container.

In one embodiment, a Container may have a view-only restriction in the same Container Attribute, such that a pulling user can view the component files of the Container but the Container cannot be transferred or nested in a new Container to be transferred to the pulling user's User Account. Furthermore, an optional setting in the same Attribute allows the originating user or SDTS Application to specify the number of views in a view-only designation (e.g., a view-once only designation). The SDTS Server can use the Server updatable Notes in the Container to record the number of times that the pulling User Account has already viewed the Container.

In one embodiment, a Container originator is required to provide a Transaction Authorization for the Container prior to posting the Container for Mail Pull.

In one embodiment, when a Container originator prepares a new Container Q1 for Mail Pull, one or more of the following procedures can occur: the originator sets the Attributes describing Container Q1 as available for Mail Pull; the originator provides a Digital Signature Transaction Authorization for Container Q1; Container Q1 is stored in a Mail Pull mailbox at the originator's User Account; SDTS Mail Pull generates a Container Link (e.g. URL), which contains information of Container Q1's UID, the corresponding Mail Pull mailbox, and the originator's User Account UID; the originating user sends the Container Link to other users. Clicking the Container Link requests access to the Container and a pull command can be sent by the SDTS Server to the Mail Pull mailbox of the Container originator's User Account. The SDTS Server can then verify the Attributes of Container Q1 and confirm if the requesting User Account is qualified to pull the Container. The SDTS Server generates a new Container Q2 nesting Container Q1 as well as an Attribute describing the transfer event details, including the transfer time stamp and the recipient User Account UID to whom Container Q2 is sent and sends Container Q2 to the requesting user's User Account through SDTS Mail; and the requesting user can then access Container Q2 at his/her User Account.

In one embodiment, SDTS Mail Pull means is used to post electronic identification Containers at a User Account such that other users can retrieve the originating user's electronic identification Container.

SDTS Applications

In one embodiment, the SDTS is a platform for a variety of SDTS Applications. The SDTS Server can execute or receive instructions to execute the SDTS Applications, and SDTS Applications can interface with, create, operate on, store, manage, and transfer Application-specific E-docs and Containers for users. SDTS Applications can customize Containers to contain Application-specific Attributes and Container Notes and provide Application-specific user interfaces at SDTS User Accounts to receive input and display information to users.

In one embodiment, the SDTS Server can assign a Container type to the Container in the Container's UID, allowing the SDTS Server to ensure that SDTS Applications can only interface, create, operate, and open certain types of Application-specific E-docs and Containers Likewise, the Container type allows the SDTS Server to invoke the appropriate SDTS Application for each Application-specific Container, filter various Application-specific types of Containers at a User Account, and store the appropriate Container UIDs in a user's Application-specific Collectable Boxes.

In one embodiment, SDTS Application Service Providers are responsible for the development and maintenance of their respective SDTS Applications. A Service Provider can be a third party using the SDTS as a platform to provide services to users, or in one embodiment, the SDTS Server itself can be a Service Provider providing and maintaining the services for a particular SDTS Application. In certain SDTS Applications, Service Providers are involved in the origination and transfer of SDTS Application-specific E-docs and Containers to users. Service Providers can also receive Application-specific E-docs and Containers upon redemption from users. In order to issue or receive SDTS Application-specific E-docs and Containers, third party Service Providers can also have a User Account at the SDTS Server.

In one embodiment, Service Providers establish customizable Application policies and Container Attributes which govern the operations and transactions of the Application-specific Containers and allow for a wide variety of electronic transactions to exist in the SDTS. Examples of customizable Application policies and Container Attributes may include but are not limited to the following: which Service Provider(s), if any, are involved in the issuance or redemption of Application-specific Containers; if the Application-specific Containers are under Single Ownership Control; if the Application-specific Containers are value-bearing items or multi-use items that require use of SDTS Value Change means; if the Application-specific Containers require Transaction Authorizations; what type of Attributes can be generated in the Application-specific Containers, including data, event details, or operations; and if Service Providers require payment prior to issuing or upon redemption of the Application-specific Containers.

With the customization of Application policies and Container Attributes and Container Notes, the variety of SDTS Applications and Application-specific Containers can be broadly categorized to include, but are not limited to, electronic versions of the following types of transaction objects: contracts, wills, sales quotes, purchase requisitions, purchase orders, invoices, receipts, official forms and letters, messages, property ownership certificates, gift certificates, gift cards, IOUs, tickets, discount coupons, prepaid cards, point cards, money, scrip, prescriptions, business cards, student IDs, driver's licenses, passports, membership cards, certificates (of completion, of achievement, etc.), diplomas, transcripts, voting ballots, test forms, ACH transfer authorizations, checks and money orders.

In one embodiment, an electronic property ownership certificate is one type of Application-specific Container and is issued by a manufacturer, vendor, or individual user to declare ownership of a tangible piece of property in the SDTS. The electronic property ownership certificate Container can nest various E-docs or Containers that provide proof of ownership or further description of the property. Examples of tangible properties that may have a corresponding electronic property ownership certificate can include, but are not limited to: automobiles, homes or other real estate, corporate stock certificates, jewelry, pets, bicycles, electronic devices, and machinery equipment. Electronic property ownership certificates may similarly be used to represent virtual inventory of a property, and a transfer of ownership of said electronic property ownership certificates may yield a responsibility of the original issuer to produce, ship, or otherwise provide the tangible property to the redeeming holder in due course of said electronic property ownership certificates. In one embodiment, an electronic property ownership certificate can represent a fraction of a tangible property. For example, an electronic property ownership certificate may represent a one-tenth ownership of a real estate property.

In one embodiment, Attributes of an Application-specific Container can carry a value, such as an electronic gift card. A Service Provider can issue and transfer to a new owner a value-bearing Container U, which nests an original E-doc U1 (e.g. a blank SDTS Gift Card) with a value-bearing E-doc U2 and contains the following: a value U Attribute; an ownership Attribute showing User Account U as the owner; and a Files Overlap Display Attribute specifying that E-doc U2 is to be displayed on top of E-doc U1. Furthermore, the ownership details (e.g. Container U's UID and the owner User Account U's UID) can be recorded in the Single Ownership Control Log. The value of the Container can be extracted from the Container's value Attribute for further transaction processing such as SDTS Value Change.

Value-bearing types of Containers are inherently more trustworthy transaction solutions than common electronic, figure-based, database systems. Figure-based systems such as online payment services do not transfer secure files that contain inherent value or the transaction information; instead the value is represented as a numerical sum that can move independently of any associated file. Because numbers or figures in these types of systems are created and recreated in a transient manner, the cause of any transaction error can be difficult to trace. Another disadvantage to a figure-based payment system is that related files cannot travel together (e.g., remittance information) making it difficult to account for details regarding each transaction. In contrast, SDTS Single Ownership Control, the nesting structure of Containers, and hash value and Transaction Authorization security features can ensure that E-docs and Containers within the SDTS can be audited for traceability. Furthermore, the SDTS can maintain a detailed transaction record for all parties.

In one embodiment, an electronic voting ballot can be an Application-specific Container for efficient and secure online voting. A Service Provider can use the SDTS Editor's form features (i.e. check boxes, text fields, form fields) to design a blank ballot form. The Service Provider can place the blank ballot under Single Ownership Control and set an Attribute preventing the completed Container from being transferred to any users with the exception of transfers back to the Service Provider. The Service Provider can issue the blank ballot to voters' User Accounts through SDTS Mail or allow voters to retrieve the ballot with a Mail Pull designation. Upon receipt of the blank ballot Container, a voter can use the SDTS Editor to make entries on a top layer E-doc in order to fill out the form. Upon completion, the entries E-doc and blank ballot Container are nested together in a new Container. Container Attributes can include a Files Overlap Display Attribute for the entries E-doc to be displayed over the blank ballot, an Attribute preventing any User Accounts from viewing the entries E-doc with exception of the voter's User Account, and an Attribute detailing data from the entries E-doc. The Service Provider can also require voters to provide Transaction Authorizations prior to returning completed ballot Containers. In one embodiment, an Application policy can specify that blank ballots and completed ballots for each voter are to be under Single Ownership Control in order to prevent any repeated voting.

In one embodiment, an electronic identification Container can be used to provide additional identification information and validity for the users behind User Accounts. An electronic identification Container can be issued by a User Account with particular authority (e.g. government entity, notary public, Certification Authority) to a subject user (i.e. the owner User Account for the electronic identification Container). The electronic identification Container can identify details of the subject user. Electronic identification Containers can require issuing authorities to provide their Transaction Authorizations such that users who receive the electronic identification can verify its integrity and the identity of the issuing authority. Users can include their electronic identification Containers as component files of new Containers as proof of identification to recipients. In another embodiment, users can post their electronic identifications at their respective User Accounts for other users to view or retrieve through SDTS Mail Pull.

In one embodiment, SDTS Users can create self-originated payment instrument types of Application-specific Containers. SDTS Users can use account data at their financial institutions to create their own electronic personal check, electronic convenience check, electronic credit card, or electronic debit card Containers as payment instruments.

In another embodiment, a Service Provider such as a financial institution can issue blank, electronic personal checks linked to a personal checking account to a User Account. Likewise, a Service Provider can issue an electronic credit or debit card linked to a credit line or personal checking account to a User Account. These types of self-originated payment instrument Containers can be verified to demonstrate that the SDTS User has a valid checking account or credit line with the Service Provider.

In another embodiment, a Service Provider issues a pre-determined or pre-paid amount for an electronic payment instrument Container. Examples of Service Provider issued payment instrument Containers can include electronic cashier's checks, and electronic money orders. The Containers can be transferred within the SDTS from User Account to User Account in multiple transaction events without being redeemed at the issuing Service Provider. Because each Container is securely maintained for its ownership and integrity, the Service Provider issued payment instruments carry inherent value that can be continuously exchanged between users in the SDTS. In one embodiment, a user can redeem his/her electronic payment instrument Container to the Service Provider's User Account and request that the Service Provider provide appropriate value through other existing means (i.e. cash or ACH transfer to a bank account). Attributes of Service Provider issued electronic payment instrument Containers can include, but are not limited to, limits to the number of ownership transfers among Users, conditions of deposit, data and details of the electronic Service Provider issued payment instrument, warranties or terms of agreement, and Files Overlap Display Attributes for component E-docs. In one embodiment, the electronic payment instrument Containers can be prepaid through a user's demand deposit account or credit line at a financial institution. The financial institution can be the Service Provider to issue the electronic payment instrument Container to said user. The electronic payment instrument Containers can be used as payment to other User Accounts, and if required, SDTS Value Change means can be used to handle change for those transactions. In another embodiment, the financial institution can issue an electronic payment instrument Container to a user without the need to prepay for the electronic payment instrument Container. The electronic payment instrument Container can be based on an established value amount in the user's demand deposit account or credit line limit. The financial institution can debit the demand deposit account or charge the credit line of the user accordingly upon the user transferring the electronic payment instrument Container as payment to another user. In another embodiment, the financial institution can debit the demand deposit account or charge the credit line of the user accordingly upon redemption of the electronic payment instrument Container to the financial institution's User Account (i.e. from a payee user).

In one embodiment, SDTS Applications can interact with and utilize the SDTS server infrastructure through an SDTS Application Programming Interface (API) and Software Development Kit (SDK). One or more APIs may be used in some embodiments (e.g., access to the SDTS Server by the SDTS Applications can be implemented with an API). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing components.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic.

In some embodiments, an API may allow a client program to use the services provided by a SDK library. For example, the SDTS can provide a SDK to third party developers for developing SDTS Applications that interface with the SDTS via an API.

In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by microcode, firmware, or other low level logic executing at least in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

Figure 10:
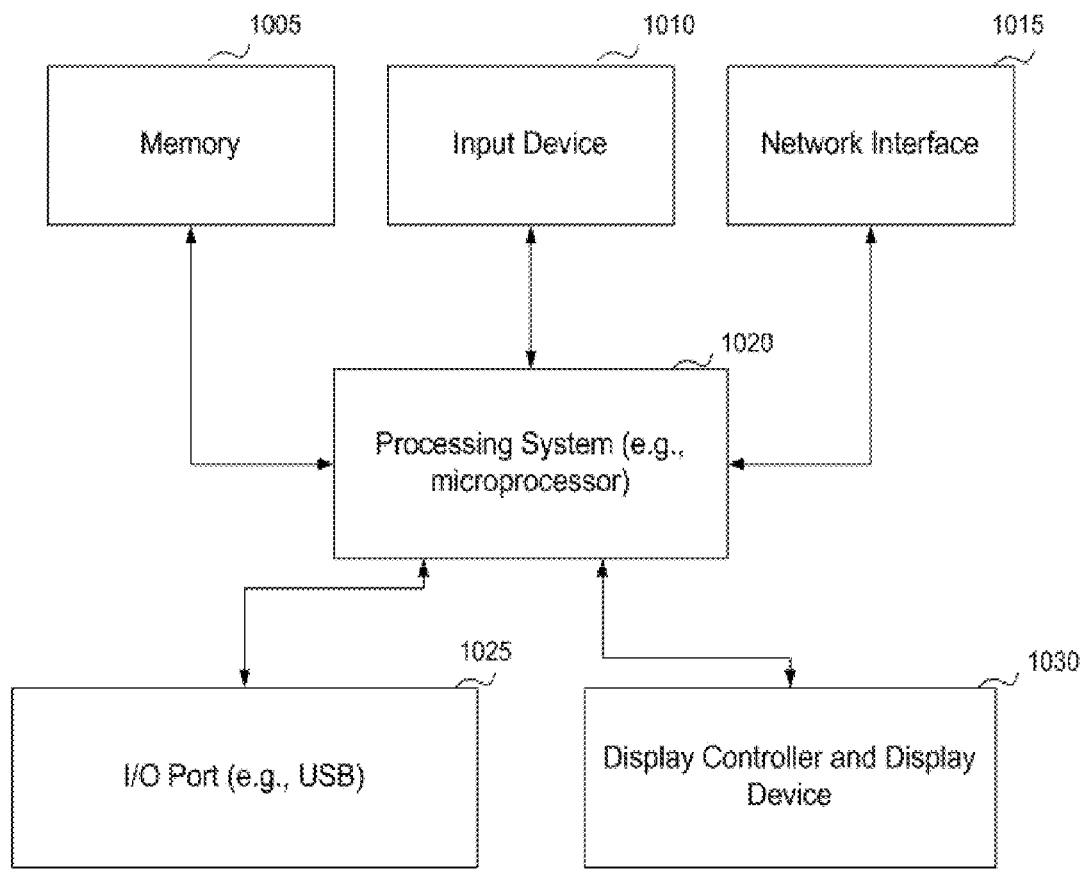
FIG. 10 illustrates a block diagram of the data processing system, in one embodiment.

FIG. 10 shows an example of data processing system which may be used with one embodiment of the SDTS Client or SDTS Server. For example and in one embodiment, the system may be implemented as a data processing device such a desktop computer, server, laptop, tablet, computer terminal, a handheld computer, a personal digital assistant, a cellular telephone, a camera, a smart phone, mobile phone, an email device, or a combination of any of these or other data processing devices.

In other embodiments, the data processing system may be a network computer or an embedded processing device within another device, or other types of data processing system having fewer components or perhaps more components than that shown in FIG. 10.

The data processing system shown in FIG. 10 includes a processing system 1020, which may be one or more microprocessors or which may be a system on a chip (integrated circuit) and the system also includes memory 1005 for storing data and programs for execution by the processing system. The memory 1005 can store, for example, the software components described above and memory 1005 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

A display controller and display device 1030 can provide a visual user interface for the user and SDTS Client. The system also can include a network interface 1015 to communicate with another data processing system. The network interface can be a WLAN transceiver (e.g., WiFi), an infrared transceiver, a Bluetooth transceiver, a wireless cellular telephony transceiver, Ethernet or other. It will be appreciated that additional components, not shown, may also be part of the system in certain embodiments, and in certain embodiments fewer components than shown in FIG. 10 may also be used in a data processing system. The system further can include one or more Input/Output (I/O) ports 1025 to enable communication with another data processing system or device. The I/O port may connect the data processing system to a USB port, Bluetooth interface, card reader, document scanner, printer etc.

The data processing system also can include one or more input devices 1010 which are provided to allow a user to provide input to the system. These input devices may be a keypad or a keyboard or a touch screen overlaid and integrated with a display device such as display device 1030. It will be appreciated that one or more buses, not shown, may be used to interconnect the various components as is well known in the art.

An article of manufacture may be used to store program code providing at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention. The specification and drawings are, accordingly, to be regarded in an illustrative sense rather than a restrictive sense.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

References to "first" or "second" or "third" followed by "User Account," "Container" or "entry" in various places in the specification, particularly when describing different figures, examples, or embodiments, are not necessarily all references to the same Containers, User Accounts, or entries.

What is claimed is:

1. A data processing system comprising:
a memory to store instructions; and
a processor coupled to the memory, the processor configured to execute the instructions to:
create a first data storage container capable of being nested as a component file of a second data storage container, wherein the first data storage container comprises:
a unique first data storage container identifier;
at least one unique component file identifier to identify at least one component file of the first data storage container, wherein a component file is an electronic document or another data storage container;
at least one component file hash value for the at least one component file;
a first attribute set; and
a first data storage container hash value calculated based on features comprising the at least one unique component file identifier, the at least one component file hash value, and the first attribute set.

2. The system of claim 1, wherein the features used to create the first data storage container hash value are unalterable upon assignment of the unique first data storage container identifier to the first data storage container.

3. The system of claim 1, wherein the first data storage container further comprises an editable notes section.

4. The system of claim 1, wherein the processor is further configured to execute instructions to perform one or more of:
recalculate the component file hash value of a component file and compare the result to a predetermined component file hash value stored in the first data storage container, wherein a hash value match constitutes verification of the integrity of said component file; and
recalculate the first data storage container hash value and compare the result to a predetermined first data storage container hash value that is stored in the first data storage container, wherein a hash value match constitutes verification of the integrity of the first data storage container.

5. The system of claim 1, wherein the processor is further configured to execute instructions to store, in a central storage, an authoritative copy of the first data storage container or an authoritative copy for each of its newly created or uploaded component files.

6. The system of claim 1, wherein the processor is further configured to execute instructions to allow a first user account to initiate one or more of:
store the unique first data storage container identifier or the at least one unique component file identifier;

access, using the unique first data storage container identifier, the first data storage container; and access, using the at least one unique component file identifier, the component file.

7. The system of claim 6, wherein the first data storage container is created by the first user account, and wherein the first attribute set includes a first set of transfer instructions for the first data storage container identifying the first user account as a sender and a first group of one or more receiving user accounts.

8. The system of claim 7, wherein the processor is further configured to execute the transfer instructions by storing the unique first data storage container identifier at each of the first group's one or more receiving user accounts.

9. The system of claim 8, wherein, upon creating the first data storage container, the processor is further configured to execute instructions to:

send a transaction authorization request to the first user account, wherein the transaction authorization request include one or more elements of: account identifier of the first user account, account identifiers for each of the first group's one or more receiving user accounts, the unique identifiers of one or more underlying files nested in the first data storage container to which the transaction authorization applies, date and time information of a running clock, transaction authorization reasons, warranties, transaction terms, or a requested electronic signature authorization type;

receive authorization from the first user account for the transaction authorization request;

add, upon receiving the authorization from the first user account, one or more elements of the transaction authorization request including finalized date and time information to the first attribute set;

calculate the first data storage container hash value;

send the first data storage container hash value to the first user account;

receive and authenticate an electronic signature from the first user account wherein the electronic signature is based at least in part on identifying information of the first user account and the first data storage container hash value; and record a transaction event to a transaction authorization log, wherein the transaction event includes one or more of: the unique first data storage container identifier, the first data storage container hash value, the electronic signature, or one or more elements of the transaction authorization request including the finalized date and time information.

10. The system of claim 9, wherein the electronic signature type is one or more of a digital signature or salted password.

11. The system of claim 9, wherein the processor is further configured to execute instructions to:

send a transaction authorization request to each of the first group's one or more receiving user accounts upon transferring the unique first data storage container identifier to each of the first group's one or more receiving user accounts;

receive one of a plurality of data storage containers from each of the first group's one or more receiving user accounts as a result of the request for a transaction authorization;

verify that the first data storage container has been nested as a component file for each of the plurality of data storage containers;

verify that each of the plurality of data storage containers has a corresponding transaction authorization from the first group's one or more receiving user accounts;

create a third data storage container including the assignment, as component files, the plurality of data storage containers to the third data storage container.

12. The system of claim 8, wherein the processor is further configured to execute instructions to:

record, to the first attribute set, authorized ownership information specifying a second user account to own the first data storage container, wherein the second user account is one of the first group's one or more receiving user accounts; and add a first entry to an ownership log specifying at least the unique first data storage container identifier and the authorized ownership information.

13. The system of claim 12, wherein the processor is further configured to execute instructions to transfer ownership of the first data storage container, the instructions to transfer ownership comprising instructions to:

obtain authorization from the owner of the first data storage container;

create the second data storage container including:

nesting the first data storage container as a component file of the second data storage container;

recording, to a second attribute set of the second data storage container, the new authorized ownership information identifying a third user account as the owner of the second data storage container; and recording, to the second attribute set of the second data storage container, a second set of transfer instructions for the second data storage container identifying the second user account as a sender and a second group of one or more receiving user accounts, wherein the third user account is one of the second group's one or more receiving user accounts;

execute the second set of transfer instructions by storing the unique second data storage container identifier in each of the second group's one or more receiving user accounts;

create a second ownership log entry comprising at least the unique second data storage container identifier and the authorized ownership information; and invalidate the first ownership log entry.

14. The system of claim 13, wherein the first attribute set contains a numerical value associated with the first data storage container, and wherein upon a change of ownership the numerical value is copied exactly or converted to a new numerical value in the second attribute set of the second data storage container.

15. The system of claim 1, wherein the first attribute set contains instructions for an electronic document editor to display a plurality of electronic documents as overlapping graphical layers on a canvas in a specified display order.

16. The system of claim 1, wherein the processor is further configured to execute an application, wherein the application is configured to interface with the first data storage container.

17. A computer-implemented method comprising:

creating a first data storage container capable of being nested as a component file of a second data storage container, wherein the first data storage container comprises:

a unique first data storage container identifier;

at least one unique component file identifier to identify at least one component file of the first data storage container, wherein a component file is an electronic document or another data storage container;

at least one component file hash value for the at least one component file;
a first attribute set; and
a first data storage container hash value calculated based on features comprising the at least one unique component file identifier, the at least one component file hash value, and the first attribute set.

18. The method of claim 17, further comprising:
recalculating the component file hash value of a component file and comparing the result to a predetermined component file hash value stored in the first data storage container, wherein a hash value match constitutes verification of the integrity of said component file; and
recalculating the first data storage container hash value and comparing the result to a predetermined first data storage container hash value that is stored in the first data storage container, and wherein a hash value match constitutes verification of the integrity the first data storage container.

19. The method of claim 17, further comprising:
storing, in a central storage, an authoritative copy of the first data storage container or an authoritative copy for each of its newly created or uploaded component files.

20. The method of claim 17, wherein the first data storage container is created by a first user account, and wherein the first attribute set includes a first set of transfer instructions for the first data storage container identifying the first user account as a sender and a first group of one or more receiving user accounts.

21. The method of claim 20, further comprising:
storing the unique first data storage container identifier at each of the first group's one or more receiving user accounts.

22. The method of claim 21, wherein upon creating the first data storage container, further comprising:
sending a transaction authorization request to the first user account, wherein the transaction authorization request includes one or more features of: account identifier of the first user account, account identifiers for each of the first group's one or more receiving user accounts, the unique identifier of the one or more underlying files nested in the first data storage container to which the transaction authorization applies, date and time information of a running clock, transaction authorization reasons, warranties, transaction terms, or a requested electronic signature authorization type;
receiving authorization from the first user account for the transaction authorization request;
adding, upon receiving the authorization from the first user account, one or more features of the transaction authorization request including finalized date and time information to the first attribute set;
calculating the first data storage container hash value;
sending the first data storage container hash value to the first user account;
receiving and authenticating an electronic signature from the first user account wherein the electronic signature is based at least in part on identifying information of the first user account and the first data storage container hash value; and
recording a transaction event to a transaction authorization log, wherein the transaction event includes one or more of: the unique first data storage container identifier, the first data storage container hash value, the electronic signature, or one or more features of the transaction authorization request including the finalized date and time information.

23. The method of claim 22, wherein the electronic signature type is one or more of a digital signature or salted password.

24. The method of claim 22, further comprising:
sending a transaction authorization request to each of the first group's one or more receiving user accounts upon transferring the unique first data storage container identifier to each of the first group's one or more receiving user accounts;
receiving one of a plurality of data storage containers from each of the first group's receiving user accounts as a result of the request for a transaction authorization;
verifying that the first data storage container has been nested as a component file for each of the plurality of data storage containers;
verifying that each of the plurality of data storage containers has a corresponding transaction authorization from the first group's one or more receiving user accounts;
creating a third data storage container including the assignment, as component files, the plurality of data storage containers to the third data storage container.

25. The method of claim 21, further comprising:
recording, to the first attribute set, authorized ownership information specifying a second user account to own the first data storage container, wherein the second user account is one of the first group's one or more receiving user accounts; and
adding a first entry to an ownership log specifying at least the unique first data storage container identifier and the authorized ownership information.

26. The method of claim 25, further comprising:
obtaining authorization from the owner of the first data storage container;
creating the second data storage container including:
nesting the first data storage container as a component file of the second data storage container;
recording, to a second attribute set of the second data storage container, the new authorized ownership information identifying a third user account as the owner of the second data storage container; and
recording, to the second attribute set of the second data storage container, a second set of transfer instructions for the second data storage container identifying the second user account as a sender and a second group of one or more receiving user accounts, wherein the third user account is one of the second group's one or more receiving user accounts;
executing the second set of transfer instructions by storing the unique second data storage container identifier in each of the second group's one or more receiving user accounts;
creating a second ownership log entry comprising at least the unique second data storage container identifier and the authorized ownership information; and
invalidating the first ownership log entry.

27. The method of claim 26, wherein the first attribute set contains a numerical value associated with the first data storage container, and wherein upon a change of ownership the numerical value is copied exactly or converted to a new numerical value in the second attribute set of the second data storage container.

28. An apparatus comprising:
means for creating a first data storage container capable of being nested as a component file of a second data storage container, wherein the first data storage container comprises:
a unique first data storage container identifier;

at least one unique component file identifier to identify at least one component file of the first data storage container, wherein a component file is an electronic document or another data storage container;

at least one component file hash value for the at least one component file;

a first attribute set; and a first data storage container hash value calculated based on features comprising the at least one unique component file identifier, the at least one component file hash value, and the first attribute set;

means for nesting the first data storage container as a component file of the second data storage container;

means for verifying integrity of a component file of the first data storage container by recalculating the component file hash value and comparing the result to a predetermined component file hash value stored in the first data storage container, and wherein a hash value match constitutes verification of its integrity; and means for verifying integrity of the first data storage container by recalculating the first data storage container hash value and comparing the result to a predetermined first data storage container hash value that is stored in the first data storage container, and wherein a hash value match constitutes verification of its integrity.

29. The apparatus of claim 28, further comprising:

means for allowing a first user account to initiate one or more of:

creating the first data storage container, and wherein the first attribute set includes a first set of transfer instructions for the first data storage container identifying the first user account as a sender and a first group of one or more receiving user accounts;

storing the unique first data storage container identifier or the at least one unique component file identifier;

accessing, using the unique first data storage container identifier, the first data storage container; and accessing, using the at least one unique component file identifier, the component file.

* * * * *